US009641434B1

(12) United States Patent
Laurence et al.

(10) Patent No.: US 9,641,434 B1
(45) Date of Patent: May 2, 2017

(54) PRIVATE NETWORK ADDRESS OBFUSCATION AND VERIFICATION

(71) Applicant: Amazon Technologies, Inc., Reno, NV (US)

(72) Inventors: Douglas Stewart Laurence, Mercer Island, WA (US); Eric Jason Brandwine, Haymarket, VA (US); Andrew Bruce Dickinson, Seattle, WA (US); James Christopher Sorenson, III, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 183 days.

(21) Appl. No.: 14/573,636

(22) Filed: Dec. 17, 2014

(51) Int. Cl.
H04L 12/743 (2013.01)
H04L 12/56 (2006.01)

(52) U.S. Cl.
CPC ........ H04L 45/741 (2013.01); H04L 45/7453 (2013.01)

(58) Field of Classification Search
None
See application file for complete search history.

(56) References Cited

U.S. PATENT DOCUMENTS 7,739,497 B1 * 6/2010 Fink .................. H04L 29/12433
713/153
8,434,139 B1 4/2013 Ortiz, Jr.
8,862,537 B1 * 10/2014 Kurtic .................. G06F 21/606
707/602
8,934,487 B2 1/2015 Vogt et al.
2011/0103394 A1 * 5/2011 Vogt .................. H04L 29/12367
370/401
2011/0305160 A1 * 12/2011 Green .................. H04L 43/026
370/252
2013/0080574 A1 * 3/2013 Prince ................. H04L 61/6013
709/217

(Continued)

OTHER PUBLICATIONS

U.S. Appl. No. 14/736,157, filed Jun. 10, 2015, Richard Sears, et al.

(Continued)

*Primary Examiner* — Chi H Pham
*Assistant Examiner* — Soon-Dong D Hyun
(74) *Attorney, Agent, or Firm* — Robert C. Kowert; Meyertons Hood, Kivlin, Kowert & Goetzel, P.C.

(57) ABSTRACT

Private network address obfuscation and verification methods and apparatus that may obfuscate private network source addresses embedded in packet header addresses when sending packets from private networks onto or over external, public networks, and that verify incoming packets to the private networks using the obfuscated private network addresses embedded in the incoming packet header destination addresses. Obfuscating the private network addresses embedded in outgoing packets and verifying incoming packets according to the obfuscated content embedded in the destination addresses may help keep the private network addresses of endpoints on the private network hidden in the packet header content on public networks and difficult to detect by entities on the public networks, which may, for example, make malicious activities such as denial of service (DoS) attacks on the private network impractical.

20 Claims, 14 Drawing Sheets

(56) References Cited

U.S. PATENT DOCUMENTS

2013/0227167 A1* 8/2013 Prince .................. H04L 45/741
709/238
2015/0350160 A1* 12/2015 Nathan .................. H04L 67/18
726/14

OTHER PUBLICATIONS

U.S. Appl. No. 14/736,161, filed Jun. 10, 2015, Richard Sears, et al.
K.G. Anagnostakis, "Tao: Protecting against Hitlist Worms using Transparent Address Obfuscation", Proceedings of the 10th IFIP Open Conference on Communications and Multimedia Security, 2006, pp. 1-11.
Florent Fourcot, et al., "IPv6 address obfuscation by intermediate middlebox in coordination with connected devices", Advances in Communication Networking, Springer Berlin Heidelberg, 2013. 148-160.
D. Thaler, et al., "IAB Thoughts on IPv6 Network Address Translation", Internet Architecture Board Request for Comments 5902, Jul. 2010, pp. 1-15.
Tim Rooney, "IPv4-to-IPv6 Transition Strategies", International Network Services (INS) Whitepaper, Feb. 2007, pp. 1-32.

* cited by examiner

PRIVATE NETWORK ADDRESS OBFUSCATION AND VERIFICATION

BACKGROUND

As the scale and scope of network-based applications and network-based services such as cloud computing and cloud-based storage services have increased, data centers may house hundreds or thousands of host devices (e.g., web servers, application servers, data servers, etc.) on a local network. A data center network may include various network equipment (e.g., servers, switches, routers, load balancers, gateways, etc.) configured to send outgoing data from the host devices onto external network(s) (e.g., the Internet) to be routed to various external destinations, and to receive incoming data from external sources and route the data to various destination host devices on the data center network. A data center network may implement a private address space according to a network protocol, for example an Internet Protocol version 4 (IPv4) subnet, for routing data to endpoints on the local network. Border devices of the data center network may translate outgoing data packets from the private address space of the data center network to a network protocol used for routing packets on the external network, for example Internet Protocol version 6 (IPv6), and translate incoming data packets from the external network communications protocol to the private address space of the data center network.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various embodiments of methods and apparatus for private network address obfuscation and verification are described. Embodiments of methods and apparatus are described that may be implemented in network environments to obfuscate private network source addresses embedded in packet header addresses when sending packets from private networks onto or over external, public networks, and that verify incoming packets to the private networks using the obfuscated private network addresses embedded in the incoming packet header destination addresses. Obfuscating the private network addresses embedded in outgoing packets and verifying incoming packets according to the obfuscated content embedded in the destination addresses may help keep the private network addresses of endpoints on the private network hidden in the packet header content on public networks and difficult to detect by entities on the public networks, which may, for example, make malicious activities such as denial of service (DoS) attacks on the private network impractical.

Figure 1:
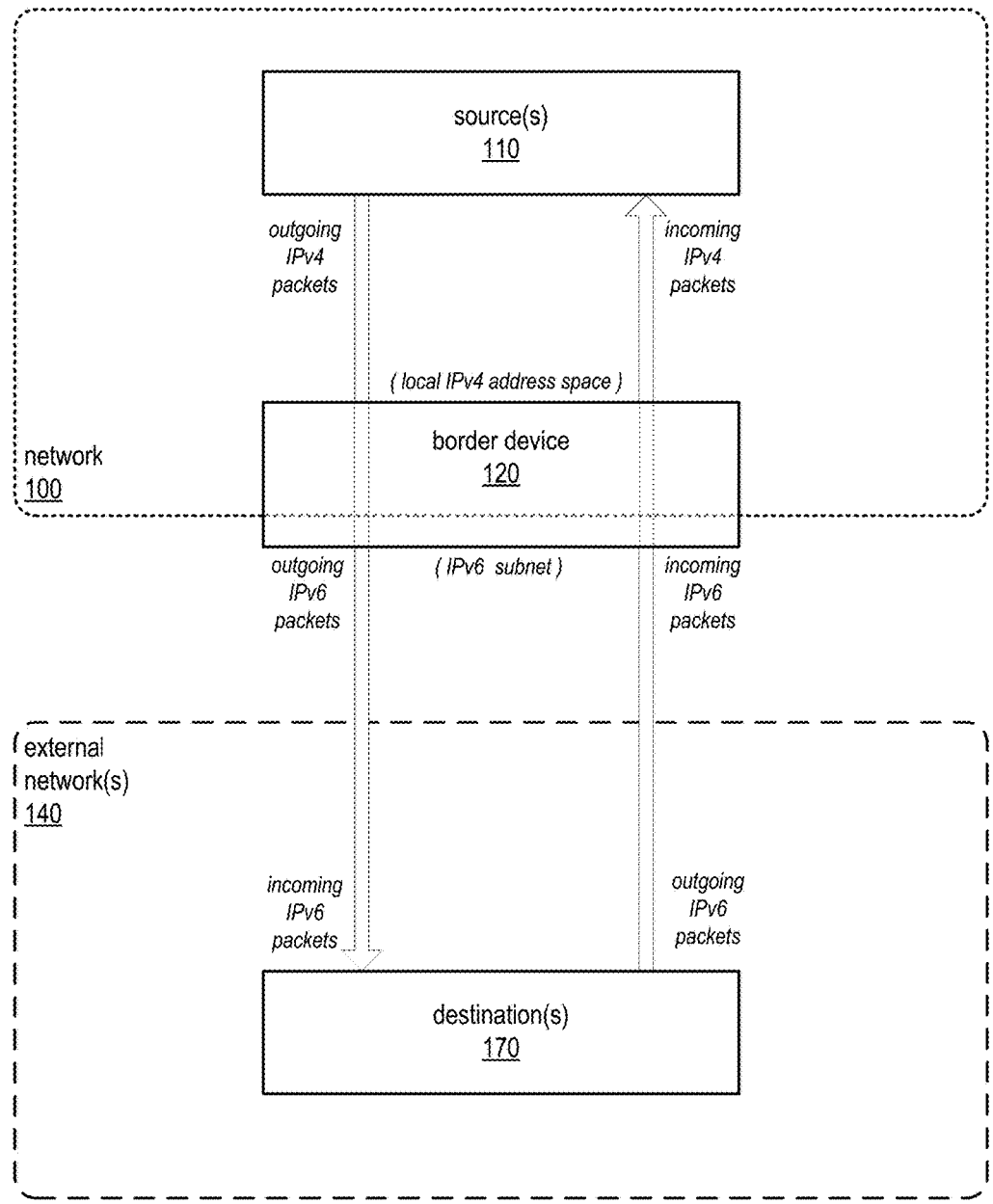
FIG. 1 graphically illustrates an example network environment in which private network address obfuscation and verification methods and apparatus may be implemented, according to at least some embodiments.

FIG. 1 graphically illustrates an example network environment in which private network address obfuscation and verification methods and apparatus may be implemented, according to at least some embodiments. Embodiments of private network address obfuscation and verification methods are described that may, for example, be implemented in network environments on or by border devices 120 between local or private networks 100 and external networks 140. A private network 100 as used herein may be a network or subnetwork with ingress and egress controlled through one or more border device(s) 120. A border device 120 as used herein may be any device, system, or node that is located on a border between networks and that is configured to control data flow between the networks. For example, a border device may be, but is not limited to, a firewall, a router, or a load balancer or load balancer node. In some embodiments, a border device 120 may be a host device that includes or implements one or more of the sources 110. In at least some embodiments, the border device(s) 120 may be or may include stateless devices that do not track active connections.

The private network 100 may implement a private or local Internet Protocol (IP) address space according to a network protocol, for example 32-bit IP addresses within an Internet Protocol version 4 (IPv4) address range or subnet. Sources 110 (e.g., endpoints such as computation resources, storage resources, servers, host systems, etc.) on private network 100 may be assigned IP addresses (e.g., 32-bit IPv4 addresses) within the private network's address space. The external network 140 may support a larger public IP address space according to a different network protocol (e.g., a 128-bit Internet Protocol version 6 (IPv6) address space). In some embodiments, the border device 120 may advertise or publish an IPv6 subnet address space on network 140.

Figure 2A:
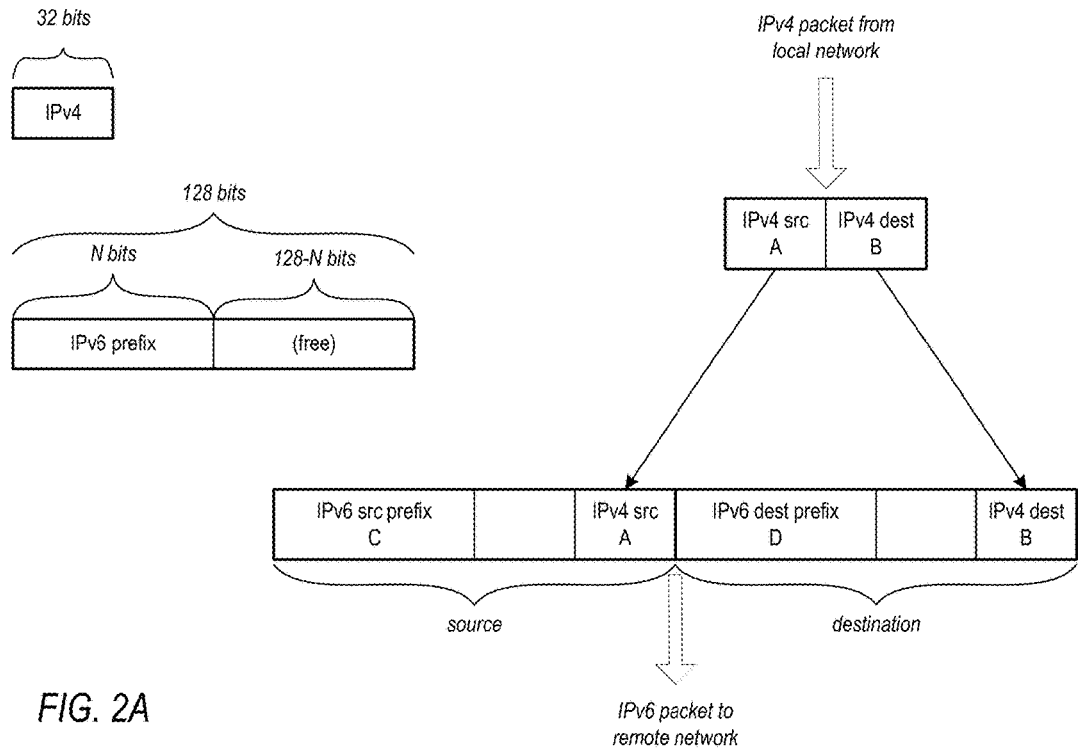
FIG. 2A graphically illustrates converting IPv4 addresses to IPv6 addresses in outgoing packets, according to at least some embodiments.

A border device 120 of the private network 100 may be configured to receive outgoing packets (e.g., IPv4 packets) from sources 110 on the private network 100, convert the packets to an IP address space used on the external network 140 (e.g., an IPv6 address space), and send the IP packets onto the external network 140 for delivery to respective destinations 170 (e.g., endpoints such as computation resources, storage resources, servers, host systems, etc.). FIG. 2A graphically illustrates converting IPv4 addresses used on private network 100 to IPv6 addresses used on an external network 140 for outgoing packets, according to at least some embodiments. As shown in FIG. 2A, IPv4 addresses are 32 bits, while IPv6 addresses are 128 bits. While IPv6 source and destination addresses are 128-bit addresses, the IPv6 subnet address space published by the border device 120 may only occupy a portion of the address space (N bits), leaving the rest of the 128-bit addresses (128-N bits) free to be used for other purposes. An IPv6 subnet address portion of an IPv6 128-bit address may be referred to as an IPv6 prefix. As a non-limiting example, a 64-bit IPv6 prefix may be used in some embodiments, leaving 64 bits free for other uses.

In some embodiments, a border device 120 may convert outgoing packets from one IP packet format to another. For example, a packet received by border device 120 from a source 110 on network 100 may be an IPv4 packet. The border device 120 may form an IPv6 packet, and embed the IPv4 source address from the original IP packet in the IPv6 source address. IPv4 addresses are 32-bit addresses, while IPv6 addresses are 128-bit addresses, so the source address (the source IPv4 address) may be embedded as 32 bits of the 128-bit IPv6 packet header source address. The IPv6 subnet address of the source 110 may be determined from the IPv4 source address and put into the IPv6 source address as the IPv6 source prefix, as illustrated in FIG. 2A.

In some embodiments, the destination address in the header of the outgoing IPv6 packet may be set to indicate a destination IPv6 address. In some embodiments, an IPv6 address for the destination 170 (or of a network device such as a load balancer or border router that fronts a network or subnet that includes the destination 170 endpoint) may be known by the border device 120, or may be discovered using network address translation (NAT) technology or some other discovery method, and may be put into the IPv6 destination address of the outgoing packet as the IPv6 destination prefix. In some embodiments, the destination 170 may be a device on another private network 100 that implements a private IPv4 address range, and the IPv4 address of the destination 170 may be embedded in the IPv6 destination address of the outgoing packet.

Referring again to FIG. 1, a border device 120 of the private network 100 may also be configured to receive incoming packets (e.g., IPv6 packets) from destinations 170 via external network 140, convert the packets to an IP address space used on the private network 100 (e.g., an IPv4 address space), and send the IPv4 packets onto the private network 110 for delivery to respective destination endpoints (e.g., sources 110) on the network 100.

Figure 2B:
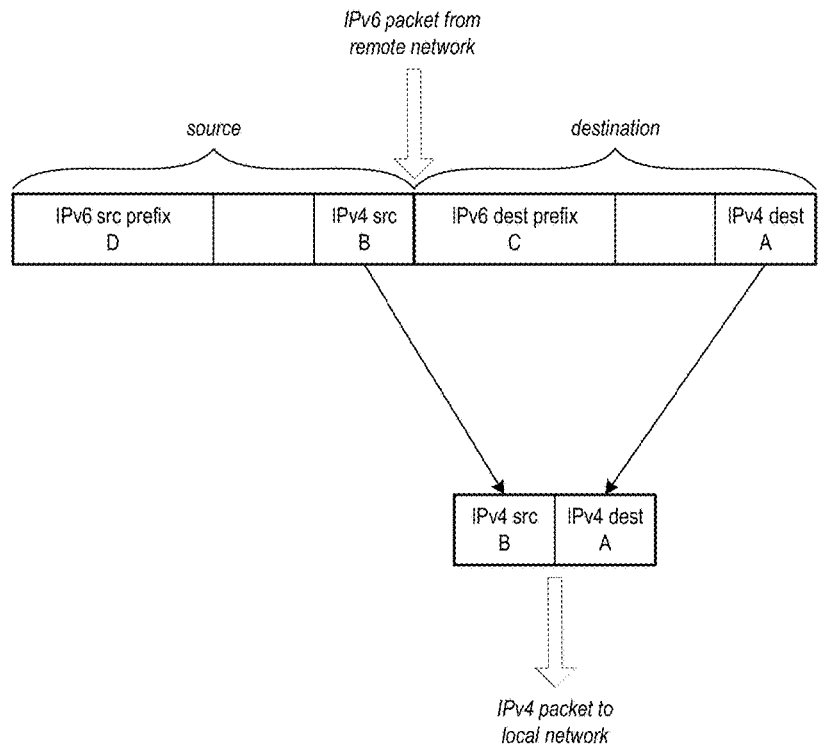
FIG. 2B graphically illustrates converting IPv6 addresses to IPv4 addresses in incoming packets, according to at least some embodiments.

FIG. 2B graphically illustrates converting IPv6 addresses used on an external network 140 to IPv4 addresses used on private network 100 for incoming packets, according to at least some embodiments. In some embodiments, a destination address of an incoming packet on the local network 100 (e.g. a destination IPv4 address indicating an endpoint (e.g., a source 110) on the local network 100) may be embedded as 32 bits of the 128-bit IPv6 packet header destination address. A border device 120 may form an IPv4 packet for an incoming packet, and may set the IPv4 destination address in the IPv4 packet to the IPv4 destination address extracted from the IPv6 destination address in the incoming packet, as illustrated in FIG. 2B.

In some embodiments, a source IPv4 address of an incoming packet may be embedded in the 128-bit IPv6 packet header source address. In some embodiments, the source IPv4 address may be the endpoint IPv4 address of a device (e.g., a destination 170) on another private network 100 that implements a private IPv4 address range. The border device 120 may set the IPv4 source address in the IPv4 packet being formed for the local network 100 to the IPv4 source address extracted from the IPv6 source address in the incoming packet, as illustrated in FIG. 2B.

While FIG. 1 shows a single border device 120 acting as an ingress and egress device for the private network 100, in some embodiments ingress and egress may be controlled by two or more border devices or nodes. In some embodiments, one or more nodes or devices may control egress for the network 100, and one or more other nodes or devices may control ingress for the network 100.

Referring again to FIG. 1, ingress to and egress from a private network 100 may be controlled through a border device 120 such as a firewall, router, or load balancer. In at least some embodiments, the border device 120 may be a stateless device that does not track active connections. In some embodiments, a border device 120 may be a host device that includes or implements one or more of the sources 110. The border device 120 may translate IPv4 addresses of the private network 100 into an IPv6 address space for routing across external network(s) 140 to destination(s) 170. Since the border device 120 is stateless and does not track active connections, there is no connection tracking to prevent incoming packets from being forwarded into the production network 100 by the border device 120. Thus, the production network may be vulnerable to attack if unwanted incoming packets arrive on the border (external) side of the border device 120. For example, if the IPv6 prefix that the border device 120 advertises becomes known, an attacker may guess the 32-bit private network IPv4 address and initiate a denial of service (DoS) attack on the private network. As another example, a malicious entity may try all possible IPv4 addresses to perform a network mapping scan of the private network 100, for example by sending Transmission Control Protocol (TCP) acknowledge (ACK) packets and listening for responses such as TCP reset (RST) packets from active hosts on the private network 100.

Embodiments of private network address obfuscation and verification methods are described that may be implemented in network environments, for example environments as illustrated in FIG. 1. The private network address obfuscation and verification methods may help keep the private network addresses of endpoints on the private network 100 hidden in the packet header content on external networks 140 and may make the internal private network addresses difficult to detect by external entities using techniques such as the network mapping scan technique described above. Thus, the private network address obfuscation and verification methods may make malicious activities such as DoS attacks and malicious network scans on the private network 100 impractical.

Embodiments of the private network address obfuscation and verification methods may leverage the fact that the border device 120 of the private network 100 advertises an IPv6 subnet and uses only an IPv6 prefix (e.g., a 64-bit prefix) in the IPv6 addresses of packet headers of outgoing packets as illustrated in FIG. 2A, and embeds a 32-bit IPv4 address in the lower portion of the IPv6 source address, leaving some bits (e.g., 32 bits) of the IPv6 address unused. Since the border device 120 does not use all of the bits in the IPv6 address on the external network 140 side, the unused bits (e.g., 32 bits) can be utilized to obfuscate and expand the attack surface of the private network 100 address space (e.g., from 32 bits to 64 bits) to render DoS and other malicious attacks impractical.

Figure 3:
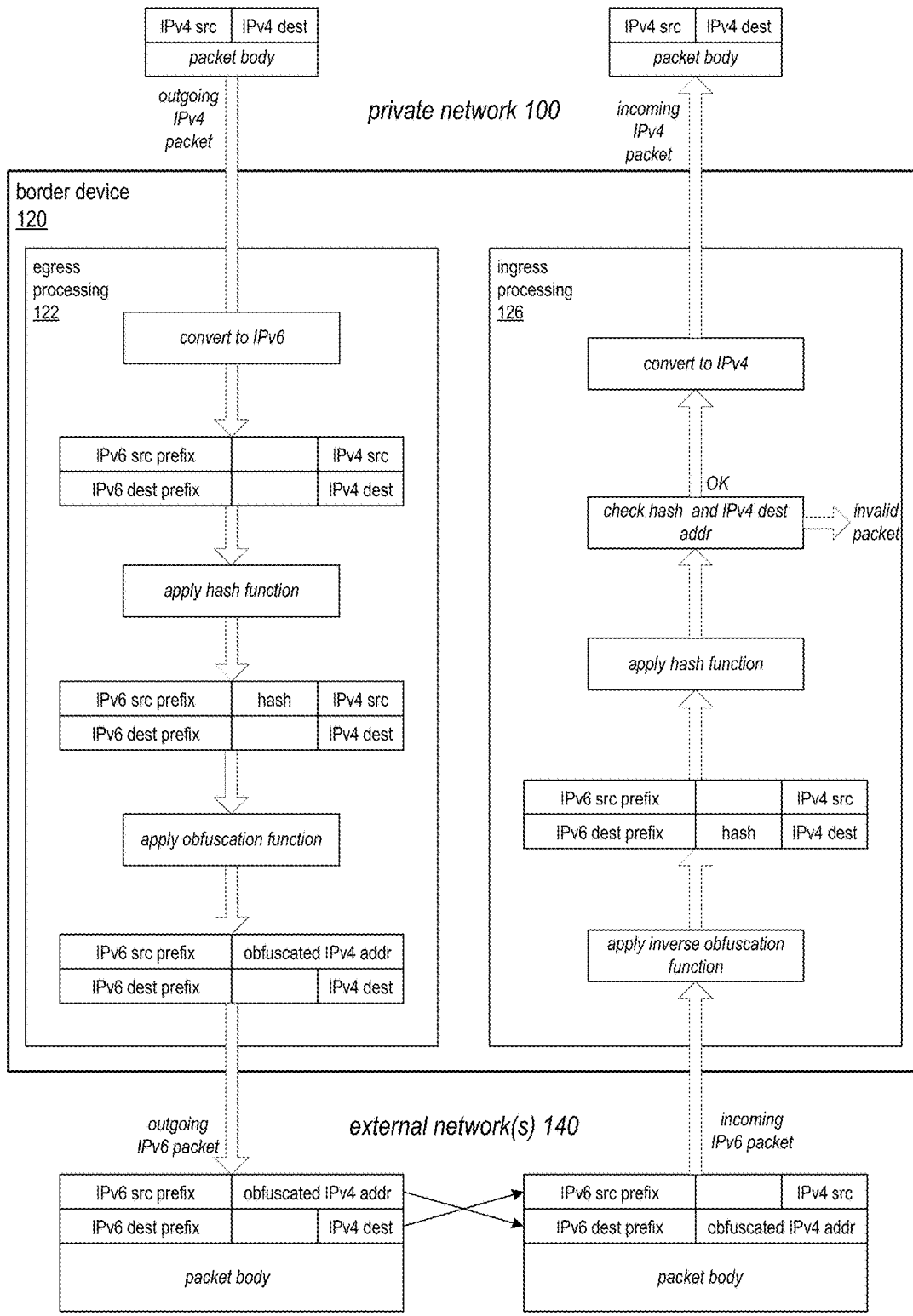
FIG. 3 graphically illustrates processing outgoing IPv4 and incoming IPv6 packets in a network border device, according to at least some embodiments.
Figure 7:
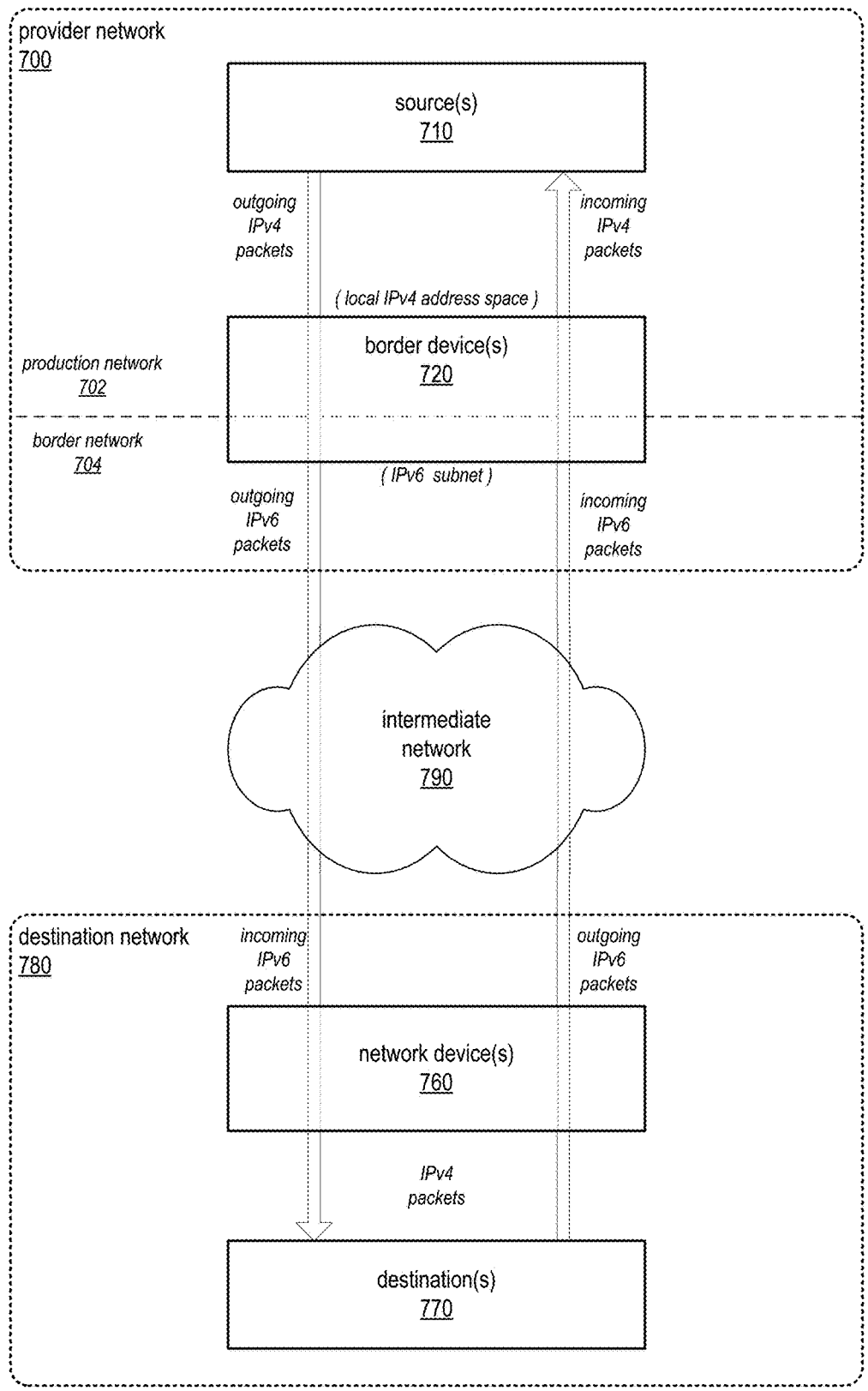
FIG. 7 graphically illustrates an example provider network environment in which private network address obfuscation and verification methods and apparatus may be implemented, according to at least some embodiments.

FIG. 3 graphically illustrates processing outgoing IPv4 and incoming IPv6 packets in an example network border device 120, according to at least some embodiments. A network border device 120 as illustrated in FIG. 3 may, for example, be implemented in a network environment as illustrated in FIG. 1 or 7. Referring to FIG. 1, ingress and egress to a private network 100 may be controlled through a border device 120 such as a firewall, router, or load balancer. As shown in FIG. 3, a border device 120 may include an egress processing 122 component, module, or node that processes outgoing packets from private network 100, and an ingress processing 126 component, module, or node that processes incoming packets from external network(s) 140.

Figure 4A:
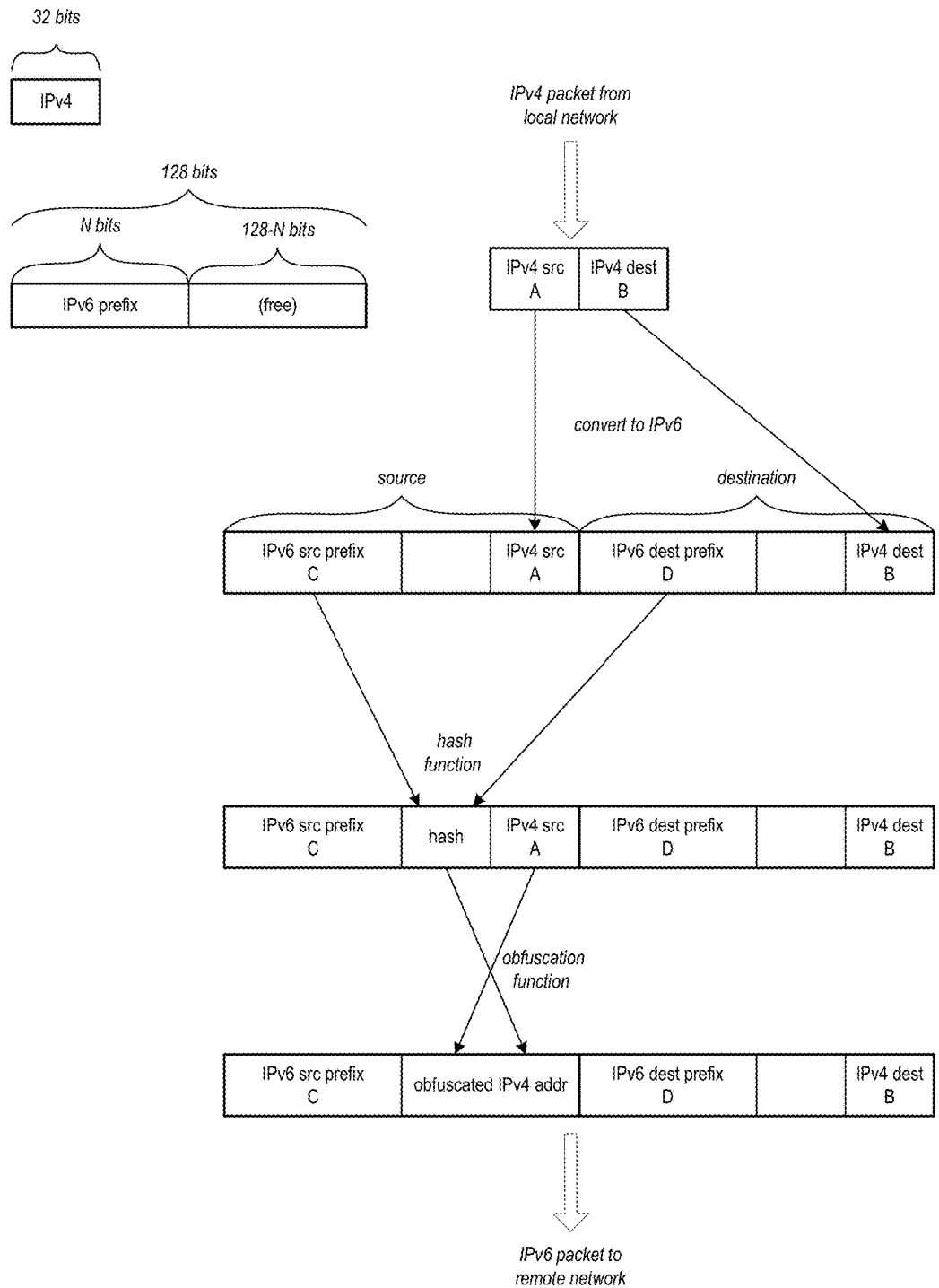
FIG. 4A graphically illustrates a method for obfuscating IPv4 private network addresses in outgoing IPv6 packet headers, according to at least some embodiments.

As illustrated in FIG. 3, an egress processing 122 component of a border device 120 for a private network 100 may be configured to receive outgoing packets (e.g., IPv4 packets) from sources on the private network 100, convert the packets to an IP address space used on the external network 140 (e.g., an IPv6 address space), and send the IPv6 packets onto the external network 140 for delivery to respective destinations (e.g., endpoints such as computation resources, storage resources, servers, host systems, etc.). The egress processing 122 component may obfuscate the IPv4 private network source addresses in the outgoing IPv6 packet headers. FIG. 4A graphically illustrates a method for obfuscating IPv4 private network addresses in outgoing IPv6 packet headers, according to at least some embodiments. As illustrated in FIGS. 3 and 4A, in some embodiments, when an outgoing packet from a private network 100 IPv4 address egresses the private network 100 via the border device 120, an egress processing 122 component of the border device 120 may convert the IPv4 packet to an IPv6 packet with an IPv6 packet header. The egress processing 122 component may apply a hash function to generate a hash (e.g., a 32-bit Cyclic Redundancy Check (CRC32) checksum value) of an immutable portion of the IPv6 packet header, for example a hash of the source and destination IPv6 addresses that are to be used to deliver the IPv6 packet to a destination 170 via an external network 140. In some embodiments, other immutable content of the IPv6 packet header may be included in the hash; for example, source and/or destination port numbers may be included in the hash. Note that the private network 100 IPv4 source address may be embedded in the lower portion of the IPv6 source address, and thus may be included in the hash. In some embodiments, an IPv4 destination address may be embedded in the lower portion of the IPv6 destination address, and thus may also be included in the hash.

The generated hash (e.g., a CRC32 checksum) may then be concatenated with the private network 100 IPv4 source address in the lower portion (e.g., the lower 64 bits) of the IPv6 source address in the IPv6 packet header. The result (e.g., a 64-bit concatenated value) may be obfuscated using an invertible obfuscation function, for example an invertible bit shuffle algorithm, block cipher, or encryption algorithm to effectively scramble the bits of the two concatenated values (the hash and the IPv4 address). Concatenating the IPv4 address with the generated hash and applying the invertible function to the concatenated value obfuscates the actual IPv4 source address in the outgoing packet header. Instead of an actual 32-bit IPv4 source address, the lower portion of the IPv6 source address now contains a 64-bit field in which the 32 bits of the IPv4 address are scrambled with the 32 bits of the hash value according to the invertible obfuscation function. The outgoing IPv6 packet may then be sent to a respective destination 170 via the external network(s) 140.

Figure 4B:
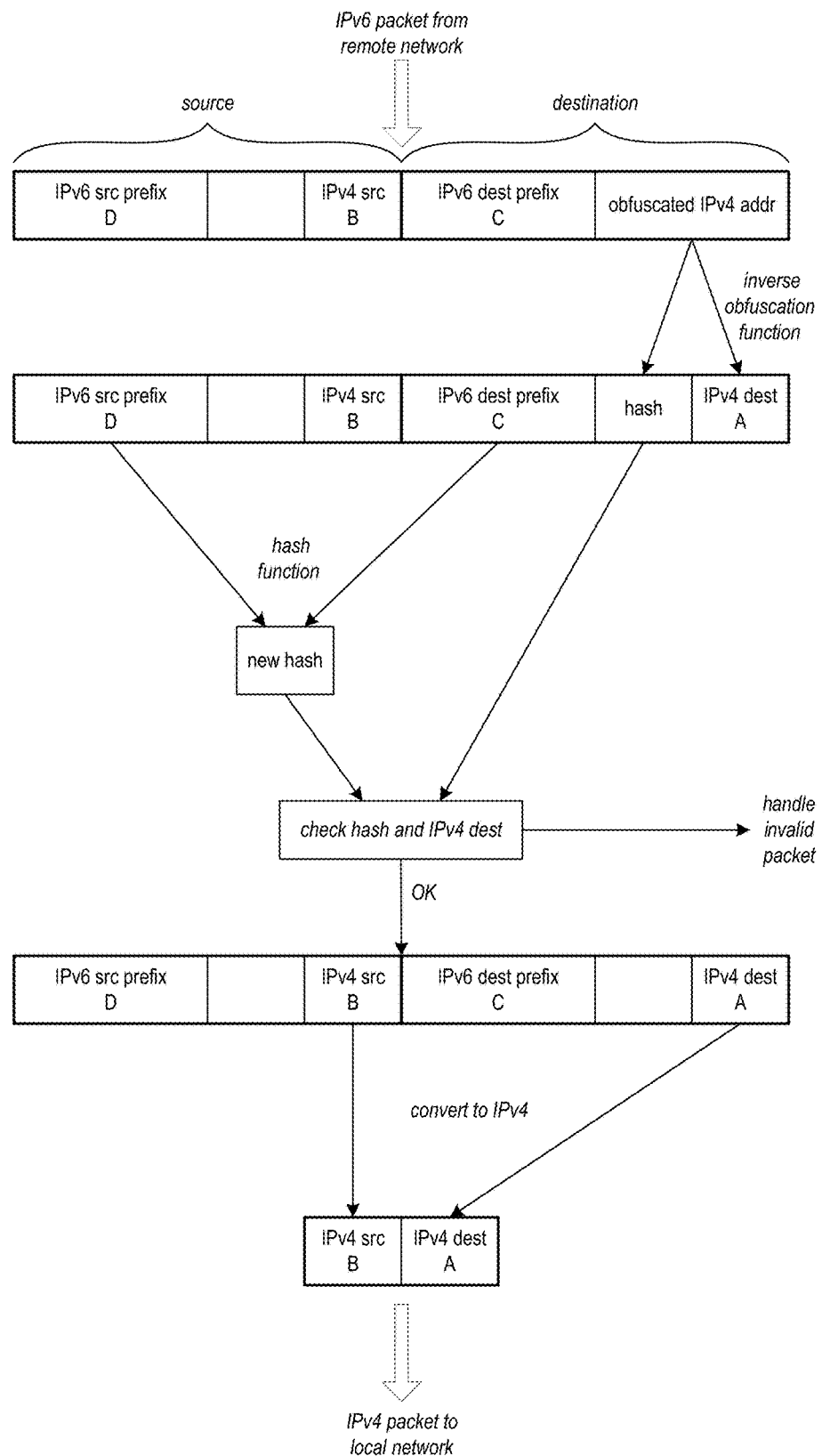
FIG. 4B graphically illustrates a method for recovering and verifying IPv4 private network addresses from incoming IPv6 packet headers, according to at least some embodiments.

The destination 170 may respond with return packet(s) (referred to herein as incoming packets) sent to the border device 120 via the external network 140. Referring to FIG. 3, a border device 120 of the private network 100 may include an ingress processing 126 component configured to receive incoming packets (e.g., IPv6 packets) from destinations 170 via external network 140, convert the packets to an IP address space used on the private network 100 (e.g., an IPv4 address space), and send the IPv4 packets onto the private network 110 for delivery to respective destination endpoints (e.g., sources 110) on the network 100. The ingress processing 126 component may recover and verify IPv4 private network addresses from the incoming IPv6 packet headers. FIG. 4B graphically illustrates a method for recovering and verifying IPv4 private network addresses from incoming IPv6 packet headers, according to at least some embodiments. As illustrated in FIGS. 3 and 4B, in some embodiments, an incoming packet to the border device 120 may include an obfuscated value embedded in the IPv6 destination address of the incoming IPv6 packet header(s), for example in the lower 64 bits of the IPv6 destination address. The ingress processing 126 component of the border device 120 may apply an inverse of the obfuscation function used by the egress processing 122 component to the lower portion (e.g., the lower 64 bits) of the IPv6 destination address to extract the hash value (e.g., a CRC32 checksum value) and the private network 100 IPv4 destination address from the IPv6 destination address.

In some embodiments, after extracting the hash value and the IPv4 destination address from the IPv6 destination address, the ingress processing 126 component may validate the incoming packet using the extracted hash value. In some embodiments, to validate the incoming packet using the hash value extracted from the IPv6 destination address of an incoming packet, the same hash function that is used by egress processing 122 to generate the hash value for outgoing packets may be applied by ingress processing 126 to the same immutable portion of the incoming IPv6 packet header that is used to generate the hash value for outgoing packets. Note that the hash value extracted from the IPv6 destination address of an incoming packet is generated from the IPv6 source and destination addresses of an outgoing packet according to the hash function. Referring to FIGS. 2A-2B and 4A-4B, in the incoming IPv6 packet, the IPv6 destination address corresponds to the outgoing IPv6 source address, and the IPv6 source address corresponds to the outgoing IPv6 destination address. Thus, when applying the hash function to the immutable portion of the incoming IPv6 packet header in the incoming packet, the source and destination addresses may be swapped so that the hash function is applied to the same content. Also note that the embedded hash value is removed from the IPv6 destination address prior to applying the hash function so that the hash function is applied to the same content. The new hash value may then be compared to the hash value extracted from the IPv6 destination address of the incoming packet. If the two hash values match, the packet is validated. Since the hash values include the private network 100 IPv4 address, the IPv4 destination address in the incoming packet is also validated. Once validated, an IPv4 packet may be generated, and the generated IPv4 packet may be sent to a respective destination 170 via the private network 100. If the packet is not validated by ingress processing 126, then the packet may be disposed of appropriately. For example, in some embodiments, an invalidated incoming packet may be simply dropped or discarded by ingress processing 126.

By utilizing the unused lower portion (e.g., the lower 64 bits) of the IPv6 source address to embed, expand, and obfuscate the 32-bit IPv4 address, embodiments may present a much larger IP address space to an attacker attempting to scan for private network 100 IPv4 addresses. An effect of using a larger space (e.g., 64 bits) for obfuscating the 32-bit IPv4 address is that most of the possible IPv4 addresses do not map to the private network 100 IPv4 address space. Thus, private network 100 IPv4 addresses may be protected, and network attacks such as denial of service (DoS) attacks may be impractical. In addition, the hash values and IPv4 addresses embedded in incoming IPv6 packet headers may be extracted and used to validate the incoming IPv6 packets, which may, for example, enable detection of a network scan attempt or other types of malicious attack if significant numbers of packets with invalid hashes are detected.

While FIG. 3 shows a single border device 120 performing egress 122 and ingress 126 processing of packets for private network 100, in some embodiments ingress and egress to the private network may be controlled by two or more border devices or nodes. In some embodiments, one or more nodes or devices may perform egress processing 122 for outgoing packets from the network 100, and one or more other nodes or devices may perform ingress processing 126 for incoming packets to the network 100.

Figure 5:
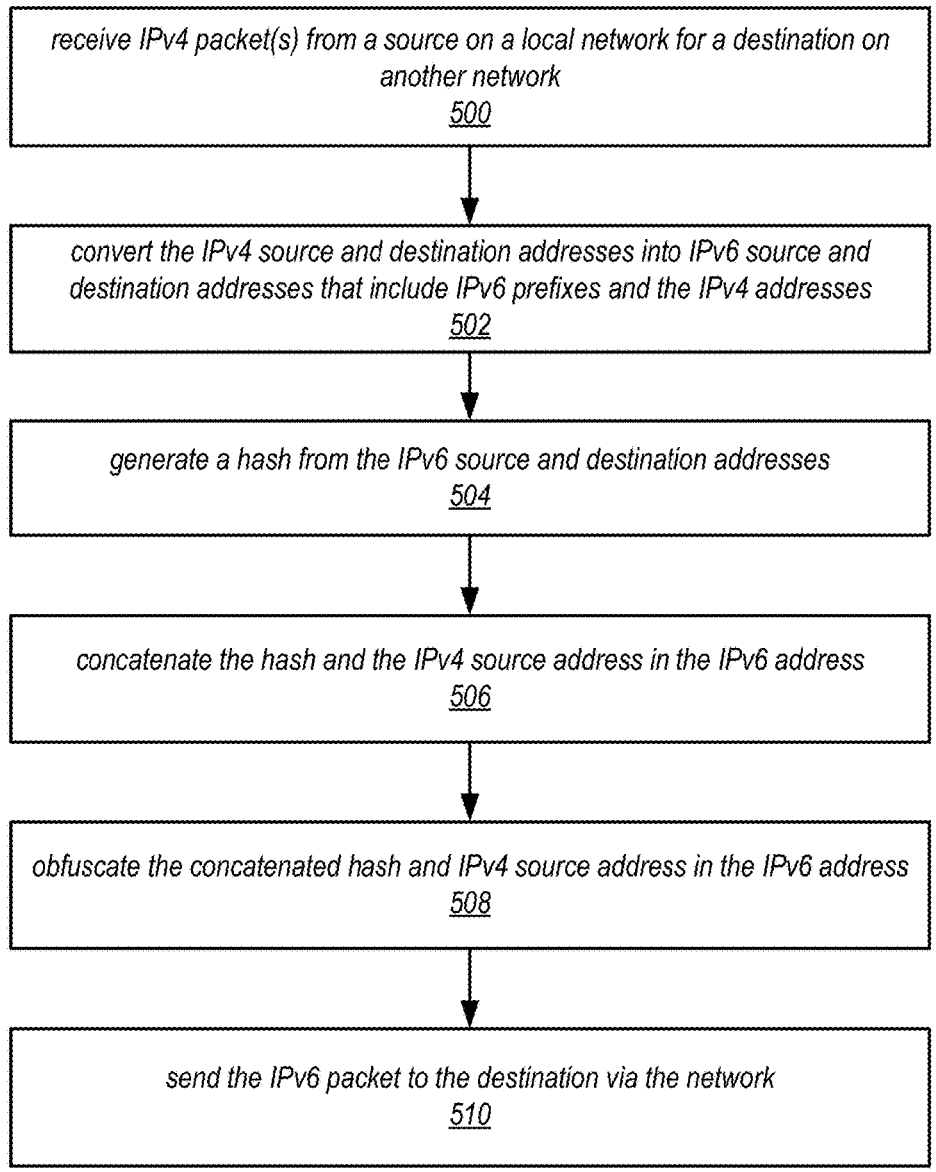
FIG. 5 is a flowchart of a method for obfuscating IPv4 private network addresses in outgoing IPv6 packet headers, according to at least some embodiments.

FIG. 5 is a flowchart of a method for obfuscating IPv4 private network addresses in outgoing IPv6 packet headers, according to at least some embodiments. The method of FIG. 5 may, for example, be implemented by a network border device in a network environment as illustrated in FIG. 1 or 7. FIG. 3 illustrates an example network border device 120 in which the method of FIG. 5 may be implemented. The border device 120 may, for example, be a firewall, router, or load balancer, or in general may be any device, system, or node that is located on a border between networks and that is configured to control data flow between the networks. FIG. 4A graphically illustrates the method for obfuscating IPv4 private network addresses in outgoing IPv6 packet headers, according to at least some embodiments.

As indicated at 500 of FIG. 5, outgoing IPv4 packet(s) may be received by a border device from a source on a local network for a destination on another network. For example, the source may be a storage or computation resource on a local private network fronted by the border device, and the destination may be another storage or computation resource on a remote private network. In some embodiments, there may be an intermediate network (e.g., the Internet) between the source network and the destination network. In some embodiments, the local network may implement a private or local IP address space, for example 32-bit IP addresses within an IPv4 address range or subnet. The source (e.g., an endpoint such as a computation resource, storage resource, server, host system, etc.) on the local network may be assigned an IP address (e.g., a 32-bit IPv4 addresses) within the local network's address space. The external network(s) may support a larger public IP address space (e.g., a 128-bit Internet Protocol version 6 (IPv6) address space). In some embodiments, a border device of the local network may advertise or publish an IPv6 subnet address space on the external network. In some embodiments, a private network that implements the destination endpoint may also implement an IPv4 address space or subnet. In some embodiments, the outgoing IPv4 packet(s) received by the border router may include a source IPv4 address and a destination IPv4 address in the IPv4 packet header.

In some embodiments, the outgoing IPv4 packet(s) may be converted to an IP address space used on an external network (e.g., an IPv6 address space). As indicated at 502 of FIG. 5 and in FIG. 4A, the IPv4 source and destination addresses in the outgoing packet may be converted into IPv6 source and destination addresses that include IPv6 prefixes and the IPv4 addresses. As shown in FIG. 4A, IPv4 addresses are 32 bits, while IPv6 addresses are 128 bits. While IPv6 source and destination addresses are 128-bit addresses, the IPv6 subnet address space published by the border device may only occupy a portion of the address space (N bits), leaving the rest of the 128-bit addresses (128-N bits) free to be used for other purposes. An IPv6 subnet address portion of an IPv6 128-bit address may be referred to as an IPv6 prefix. As a non-limiting example, a 64-bit IPv6 prefix may be used in some embodiments, leaving 64 bits free for other uses.

As indicated at 504 of FIG. 5 and in FIG. 4A, a hash may be generated from the IPv6 source and destination addresses according to a hash function. The border device may apply a hash function to generate a hash (e.g., a Cyclic Redundancy Check (CRC) checksum value such as a CRC32 checksum) of an immutable portion of the IPv6 packet header, for example a hash of the source and destination IPv6 addresses that are to be used to deliver the IPv6 packet to the destination via an external network. In some embodiments, the network IPv4 source address may be embedded in the lower portion of the IPv6 source address, and thus may be included in the hash. In some embodiments, an IPv4 destination address may be embedded in the lower portion of the IPv6 destination address, and thus may also be included in the hash.

As indicated at 506 of FIG. 5 and in FIG. 4A, the hash and the IPv4 source address may be concatenated in the IPv6 address. For example, the generated hash (e.g., a CRC32 checksum) may be concatenated with the local network IPv4 source address in the lower portion (e.g., the lower 64 bits) of the IPv6 source address in the IPv6 packet header.

As indicated at 508 of FIG. 5 and in FIG. 4A, the concatenated hash and IPv4 source address may be obfuscated in the IPv6 source address according to an obfuscation function. In at least some embodiments, the obfuscation function that is used is reversible, or has an inverse function that can extract or recover the original content from the obfuscated content. For example, an invertible bit shuffle algorithm, block cipher, or encryption algorithm may be used to obfuscate the concatenated value in the IPv6 source address. Concatenating the IPv4 address with the generated hash and applying the invertible function to the concatenated value obfuscates the actual IPv4 source address in the outgoing packet header. Instead of an actual 32-bit IPv4 source address, the lower portion of the IPv6 source address now contains a 64-bit field in which the 32 bits of the IPv4 address are scrambled with the 32 bits of the hash value according to the invertible obfuscation function.

As indicated at 510 of FIG. 5 and in FIG. 4A, the IPv6 packet, including the obfuscated content in the lower portion of the IPv6 source address, may be sent to the respective destination via the external network and according to the IPv6 destination address information included in the IPv6 packet. The destination may respond with return IPv6 packet(s) (referred to herein as incoming packets) sent to the border device via the external network. In at least some embodiments, the obfuscated content included in the lower portion of the IPv6 source address in the outgoing IPv6 packet headers may be included in the lower portion of the IPv6 destination address in the incoming IPv6 packets. The upper portion of the IPv6 destination address in the incoming packet headers may include the IPv6 prefix that was included in the outgoing IPv6 packets. The IPv6 source address in the incoming IPv6 packet headers may indicate the IPv6 prefix and IPv4 address of the destination that was included in the outgoing IPv6 packets.

In some embodiments, instead of applying the method of FIG. 5 to each outgoing packet, the network border device may be applied to one or more initial outgoing IPv4 packets from a particular source to a particular destination to generate the obfuscated portion (e.g., a 64-bit value) of the IPv6 source address for the outgoing IPv6 packet. For one or more subsequent outgoing packets from the source to the destination, the obfuscated content generated for the first packet(s) may be embedded in the IPv6 source address (e.g., in the lower 64 bits of the IPv6 source address) without having to re-generate the obfuscated portion for each packet.

Figure 6:
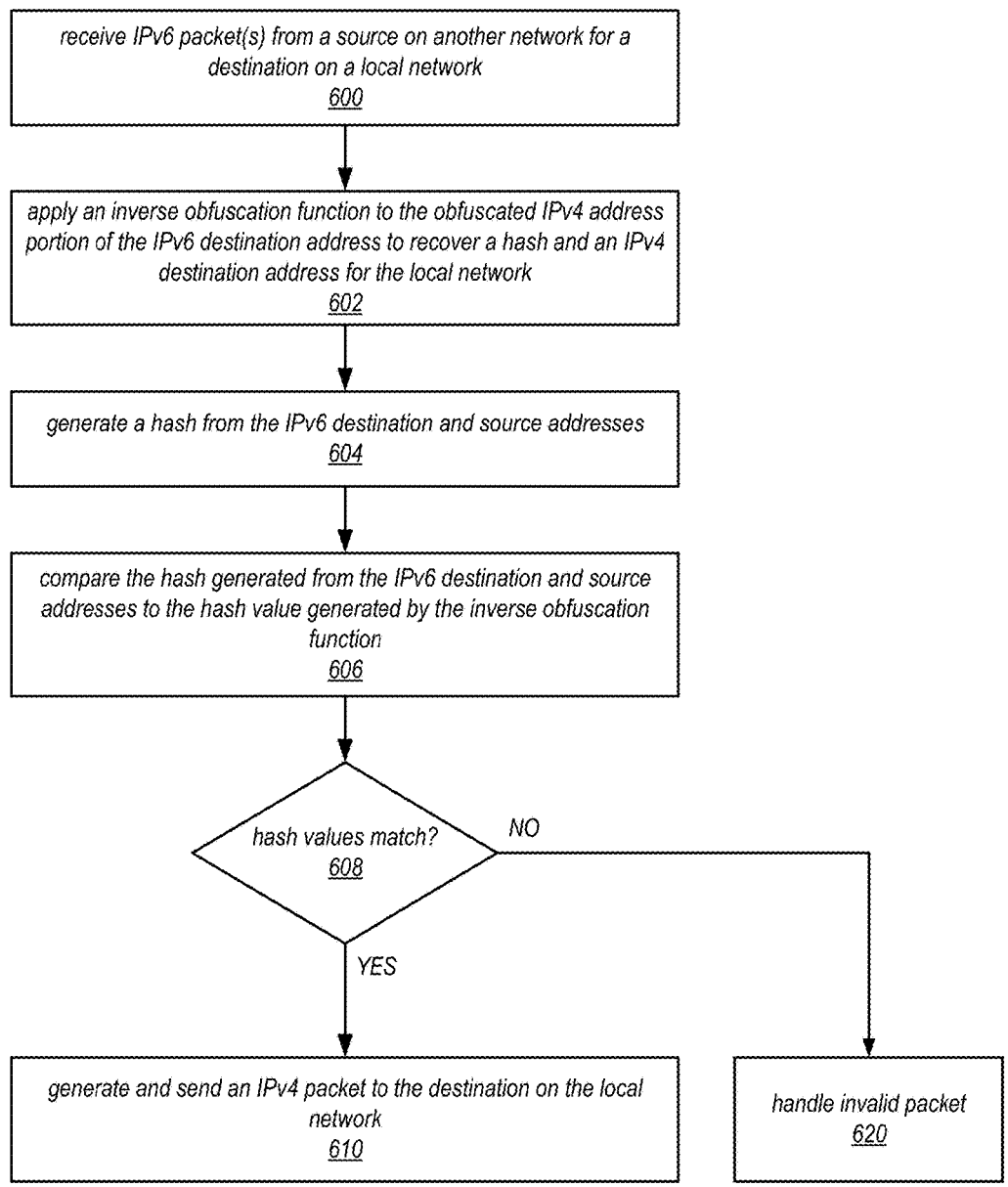
FIG. 6 is a flowchart of a method for recovering and verifying IPv4 private network addresses from incoming IPv6 packet headers, according to at least some embodiments.

FIG. 6 is a flowchart of a method for recovering and verifying IPv4 private network addresses from incoming IPv6 packet headers, according to at least some embodiments. The method of FIG. 6 may, for example, be implemented by a network border device in a network environment as illustrated in FIG. 1 or 7. FIG. 3 illustrates an example network border device in which the method of FIG. 6 may be implemented. FIG. 4B graphically illustrates a method for recovering and verifying IPv4 private network addresses from incoming IPv6 packet headers, according to at least some embodiments.

As noted above in reference to FIGS. 5 and 4A, the destination that receives the outgoing IPv6 packets from a source on a private network may respond with return IPv6 packet(s) (referred to herein as incoming packets) sent to the border device via the external network. As indicated at 600 of FIG. 6 and in FIG. 4B, IPv6 packet(s) may be received by a border device for a destination on a local network from a source on another network. For example, the source may be a storage or computation resource on a remote private network, and the destination may be another storage or computation resource on a local private network fronted by the border device. In some embodiments, there may be an intermediate network (e.g., the Internet) between the source network and the local network. In some embodiments, the local network may implement a private or local IP address space, for example 32-bit IP addresses within an IPv4 address range or subnet. The destination (e.g., an endpoint such as a computation resource, storage resource, server, host system, etc.) on the local network may be assigned an IP address (e.g., a 32-bit IPv4 addresses) within the local network's address space. The external network(s) may support a larger public IP address space (e.g., a 128-bit Internet Protocol version 6 (IPv6) address space). In some embodiments, a border device of the local network may advertise or publish an IPv6 subnet address space on the external network. In some embodiments, a private network that implements the source endpoint may also implement an IPv4 address space or subnet. In at least some embodiments, the incoming IPv6 packet(s) received by the border router of the local network may include a source IPv6 address and a destination IPv6 address in the IPv6 packet header. In at least some embodiments, the obfuscated content included in the lower portion of the IPv6 source address in the outgoing IPv6 packet headers as described in FIG. 5 may be included in the lower portion of the IPv6 destination address in the incoming IPv6 packets. The upper portion of the IPv6 destination address in the incoming packet headers may include the IPv6 prefix that was included in the outgoing IPv6 packets. The IPv6 source address in the incoming IPv6 packet headers may indicate the IPv6 prefix and IPv4 address of the destination that was included in the outgoing IPv6 packets.

As indicated at 602 of FIG. 6 and in FIG. 4B, an inverse obfuscation function may be applied to the obfuscated IPv4 address portion of the IPv6 destination address to recover a hash value and an IPv4 destination address for the local network from the obfuscated content. In at least some embodiments, the border device may apply an inverse of the obfuscation function used at 508 of FIG. 5 to the lower portion (e.g., the lower 64 bits) of the IPv6 destination address to extract the hash value (e.g., a CRC32 checksum value) and the private network 100 IPv4 destination address from the IPv6 destination address.

As indicated at 604 of FIG. 6 and in FIG. 4B, a hash may be generated from the IPv6 destination and source addresses of the incoming packet using the same hash function that was used at 504 of FIG. 5 to generate hashes for outgoing packets. As shown at 504 of FIG. 5, the hash that was recovered from the obfuscated content at 602 of FIG. 6 was generated from the IPv6 source and destination addresses of an outgoing packet according to the hash function. Referring to FIGS. 2A-2B and 4A-4B, in the incoming packet, the IPv6 destination address corresponds to the outgoing IPv6 source address, and the IPv6 source address corresponds to the outgoing IPv6 destination address. Thus, when applying the hash function to the IPv6 addresses in the incoming packet, the source and destination IPv6 addresses may be swapped so that the hash function is applied to the same content. Also note that the embedded hash value is removed from the IPv6 destination address prior to applying the hash function so that the hash function is applied to the same content.

As indicated at 606 of FIG. 6 and in FIG. 4B, the hash generated from the immutable content of the incoming packet header (e.g., the IPv6 destination and source addresses of the incoming packet) at 604 may be compared to the hash value recovered from the obfuscated portion of the IPv6 destination address of the incoming packet using the inverse obfuscation function at 602. If the two hash values match, the packet is validated. Since the hash values include the local network IPv4 address, the IPv4 destination address in the incoming packet is also validated if the hash values match. At 608 of FIG. 6, if the hash values compared at 606 match, then at 610 an IPv4 packet may be generated, and the generated IPv4 packet may be sent to the destination on the local network. At 608 of FIG. 6, if the hash values compared at 606 do not match, then the incoming packet is not valid and is handled appropriately at 620. For example, in some embodiments, the incoming packet may be simply dropped or discarded.

FIG. 7 graphically illustrates an example provider network environment in which private network address obfuscation and verification methods and apparatus may be implemented, according to at least some embodiments. Embodiments of the private network address obfuscation and verification methods and apparatus as described herein may, for example, be implemented in the context of a service provider that provides to clients, via an intermediate network 790 such as the Internet, virtualized resources (e.g., virtualized computing and storage resources) implemented on a provider network 700 of the service provider, and that may provide virtualized private networks on the provider network 700 in which clients may provision their virtualized resources. FIGS. 9 through 12 and the section titled Example provider network environments illustrate and describe example service provider network environments in which embodiments of the methods and apparatus as described herein may be implemented.

As illustrated in FIG. 7, a provider network 700 may include a production network 702 and a border network 704. The production network 702 may implement a private Internet Protocol (IP) address space, for example 32-bit IP addresses within an Internet Protocol version 4 (IPv4) address range or subnet. Sources 710 (e.g., endpoints such as computation resources, storage resources, servers, host systems, etc.) on production network 702 may be assigned IP addresses (e.g., 32-bit IPv4 addresses) within the production network 702 address space. The border network 704 is between the production network 702 and an intermediate network 790 (e.g., the Internet); the border network 704 and intermediate network 790 may support a larger public IP address space, for example 128-bit Internet Protocol version 6 (IPv6) addresses. In some embodiments, one or more border devices 720 of production network 702 may advertise or publish an IPv6 subnet address space on border network 704, and may map the IPv4 address space of the production network 702 to the published IPv6 address space.

Another network reachable via the intermediate network 790, referred to in FIG. 7 as a destination network 780, may include one or more destinations 770 (e.g., endpoints such as computation resources, storage resources, servers, host systems, etc.). The destination(s) 770 may be fronted by one or more network devices 760 (e.g., firewalls, routers, load balancers, etc.) that control ingress to and egress from the destination(s) 770.

In some embodiments, border device(s) 720 of production network 702 may be or may include a network border device 120 as illustrated in FIG. 3 that implements the private network address obfuscation and verification methods as illustrated in FIGS. 3, 4A-4B, 5, and 6 to obfuscate the production network 702 IPv4 addresses in at least some outgoing IPv6 packets sent from production network 702 to destinations via border network 704 and intermediate network 790, and to verify at least some incoming IPv6 packets from border network 704.

In addition, in some embodiments, the destination network 780 may also implement a private IPv4 address space, and one or more network devices 760 of the network 780 may be or may include a network border device 120 as illustrated in FIG. 3 that implements the private network address obfuscation and verification methods as illustrated in FIGS. 3, 4A-4B, 5, and 6 for the destination network 780 to obfuscate the destination network 780's IPv4 addresses in at least some outgoing IPv6 packets sent from sources on destination network 780 to destinations on other networks (including but not limited to destinations on provider network 700) via intermediate network 790, and to verify at least some incoming IPv6 packets to destination network 780 from other networks.

In FIGS. 1 through 7, the destination does not necessarily have to know the IPv4 address of the source from which the IPv6 packets that include obfuscated content in the source address field of the header are received. The obfuscated content may simply be copied from the IPv6 source address of an incoming packet at the destination and used in the IPv6 destination address of outgoing packet(s) from the destination to the source, along with the respective IPv6 prefix of the source. However, in some embodiments, a destination may need to know the IPv4 address of the source. For example, referring to FIG. 7, resources on destination network 780 (i.e., destination(s) 770) that are accessible by resources on production network 702 (i.e., source(s) 710) may be allocated or tracked according to the IPv4 addresses of the source(s) 710. Thus, in some embodiments, the IPv4 source address that is obfuscated in the IPv6 source address of outgoing packets from a source network (e.g., production network 702 in FIG. 7) may need to be recovered from the obfuscated content in the IPv6 source addresses of incoming packets on a destination network (e.g., destination network 780 in FIG. 7). To recover the obfuscated IPv4 address from a packet header, the network device needs to implement at least the inverse of the obfuscation function used to obfuscate the hash value and IPv4 source address in the IPv6 source address of the IPv6 packet header.

Figure 8:
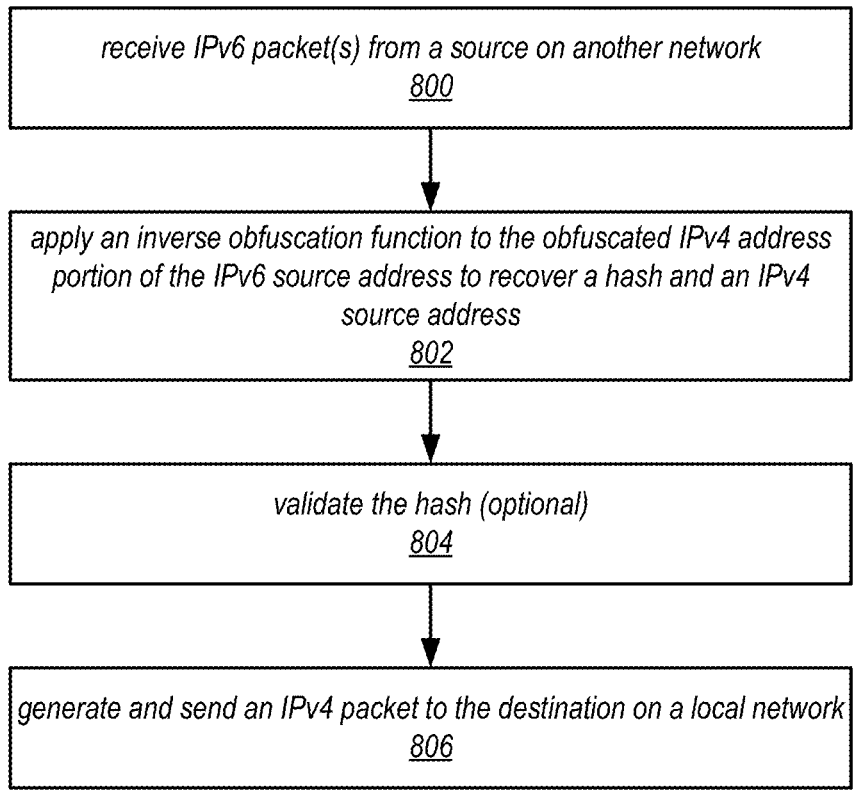
FIG. 8 is a flowchart of a method for recovering an IPv4 source address from incoming IPv6 packet headers, according to at least some embodiments.

FIG. 8 is a flowchart of a method for recovering an IPv4 source address from incoming IPv6 packet headers, according to at least some embodiments. The method of FIG. 8 may be implemented by a network device in a network, for example by a network device 760 (e.g., a firewall, router, load balancer, etc.) as illustrated in FIG. 7 that controls ingress to and egress from destination(s) 770. As indicated at 800 of FIG. 8, a network device may receive IPv6 packet(s) from a source on another network. As indicated at 802 of FIG. 8, the network device may apply an inverse obfuscation function to the obfuscated IPv4 address portion of the IPv6 source address to recover a hash and an IPv4 source address. In at least some embodiments, the network device may apply an inverse of the obfuscation function used at 508 of FIG. 5 to the lower portion (e.g., the lower 64 bits) of the IPv6 source address to extract the hash value (e.g., a CRC32 checksum value) and the private network IPv4 source address from the IPv6 source address. As indicated at 804 of FIG. 8, the network device may optionally validate the hash value extracted from the IPv6 source address, for example as illustrated and described at elements 604 through 608 of FIG. 6. Note that, to validate the hash, the network device needs to know the hash function used to generate the hash embedded in the obfuscated portion of the IPv6 source address. As indicated at 806 of FIG. 8, the network device may generate and send an IPv4 packet to the respective destination on a local network fronted by the device as indicated in the incoming packet destination address. The IPv4 source address recovered from the IPv6 source address may be included in the generated IPv4 packet.

While embodiments of the methods and apparatus for private network address obfuscation and verification as described in reference to FIGS. 1 through 8 generally refer to 128-bit IPv6 network addresses in which an upper portion of 64 bits are used for an IPv6 address prefix, and the lower portion of 64 bits are used for obfuscating a 32-bit IPv4 address concatenated with a 32-bit hash of an immutable portion of the IPv6 header, in various embodiments other shorter or longer lengths may be used for IPv6 prefixes, and thus more or fewer unused bits may be available in an IPv6 address for the IPv4 address and hash. Thus, in some embodiments, hash functions may be used that generate other lengths of hashes than 32 bits (e.g., 16 bits, 24 bits, 48 bits, etc.) that are concatenated with the IPv4 source address and obfuscated in the lower, unused portion of the IPv6 source address. In addition, in some embodiments, one or more of the lower bits that are not used for the IPv6 prefix may be used for other purposes, and thus the portion of the IPv6 source address used for the concatenated and obfuscated hash value and IPv4 source address may be correspondingly reduced.

In some embodiments, the invertible obfuscation function used to obfuscate the concatenated hash value and IPv4 source address in outgoing IPv6 packets may be randomly varied among different obfuscation functions or otherwise randomized to help protect against malicious discovery and use of the obfuscation function.

While embodiments of the methods and apparatus for private network address obfuscation and verification as described in reference to FIGS. 1 through 8 are generally described as being implemented in stateless networking devices, embodiments may also be implemented in stateful networking devices.

Example Provider Network Environments

This section describes example provider network environments in which embodiments of the methods and apparatus for private network address obfuscation and verification as described in reference to FIGS. 1 through 8 may be implemented. However, these example provider network environments are not intended to be limiting.

Figure 9:
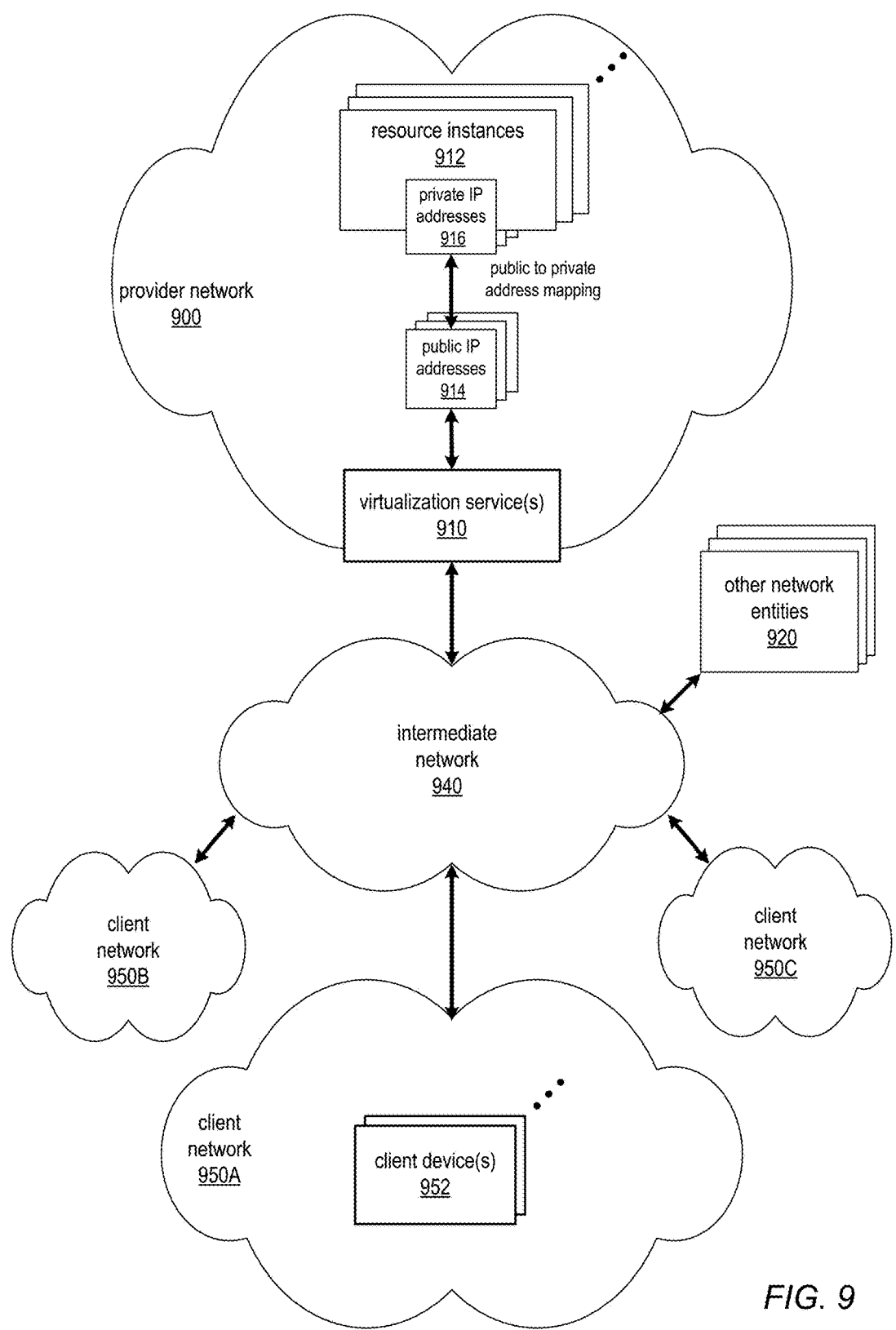
FIG. 9 illustrates an example provider network environment, according to at least some embodiments.

FIG. 9 illustrates an example provider network environment, according to at least some embodiments. A provider network 900 may provide resource virtualization to clients via one or more virtualization services 910 that allow clients to purchase, rent, or otherwise obtain instances 912 of virtualized resources, including but not limited to computation and storage resources, implemented on devices within the provider network or networks in one or more data centers. Private IP addresses 916 may be associated with the resource instances 912; the private IP addresses are the internal network addresses of the resource instances 912 on the provider network 900. In some embodiments, the provider network 900 may also provide public IP addresses 914 and/or public IP address ranges (e.g., Internet Protocol version 4 (IPv4) or Internet Protocol version 6 (IPv6) addresses) that clients may obtain from the provider 900.

Conventionally, the provider network 900, via the virtualization services 910, may allow a client of the service provider (e.g., a client that operates client network 950A) to dynamically associate at least some public IP addresses 914 assigned or allocated to the client with particular resource instances 912 assigned to the client. The provider network 900 may also allow the client to remap a public IP address 914, previously mapped to one virtualized computing resource instance 912 allocated to the client, to another virtualized computing resource instance 912 that is also allocated to the client. Using the virtualized computing resource instances 912 and public IP addresses 914 provided by the service provider, a client of the service provider such as the operator of client network 950A may, for example, implement client-specific applications and present the client's applications on an intermediate network 940, such as the Internet. Other network entities 920 on the intermediate network 940 may then generate traffic to a destination public IP address 914 published by the client network 950A; the traffic is routed to the service provider data center, and at the data center is routed, via a network substrate, to the private IP address 916 of the virtualized computing resource instance 912 currently mapped to the destination public IP address 914. Similarly, response traffic from the virtualized computing resource instance 912 may be routed via the network substrate back onto the intermediate network 940 to the source entity 920.

Private IP addresses, as used herein, refer to the internal network addresses of resource instances in a provider network. Private IP addresses are only routable within the provider network. Network traffic originating outside the provider network is not directly routed to private IP addresses; instead, the traffic uses public IP addresses that are mapped to the resource instances. The provider network may include network devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the client. Traffic routed to a public IP address is translated, for example via 1:1 network address translation (NAT), and forwarded to the respective private IP address of a resource instance.

Some public IP addresses may be assigned by the provider network infrastructure to particular resource instances; these public IP addresses may be referred to as standard public IP addresses, or simply standard IP addresses. In at least some embodiments, the mapping of a standard IP address to a private IP address of a resource instance is the default launch configuration for all resource instance types.

At least some public IP addresses may be allocated to or obtained by clients of the provider network 900; a client may then assign their allocated public IP addresses to particular resource instances allocated to the client. These public IP addresses may be referred to as client public IP addresses, or simply client IP addresses. Instead of being assigned by the provider network 900 to resource instances as in the case of standard IP addresses, client IP addresses may be assigned to resource instances by the clients, for example via an API provided by the service provider. Unlike standard IP addresses, client IP Addresses are allocated to client accounts and can be remapped to other resource instances by the respective clients as necessary or desired. A client IP address is associated with a client's account, not a particular resource instance, and the client controls that IP address until the client chooses to release it. Unlike conventional static IP addresses, client IP addresses allow the client to mask resource instance or availability zone failures by remapping the client's public IP addresses to any resource instance associated with the client's account. The client IP addresses, for example, enable a client to engineer around problems with the client's resource instances or software by remapping client IP addresses to replacement resource instances.

Figure 10:
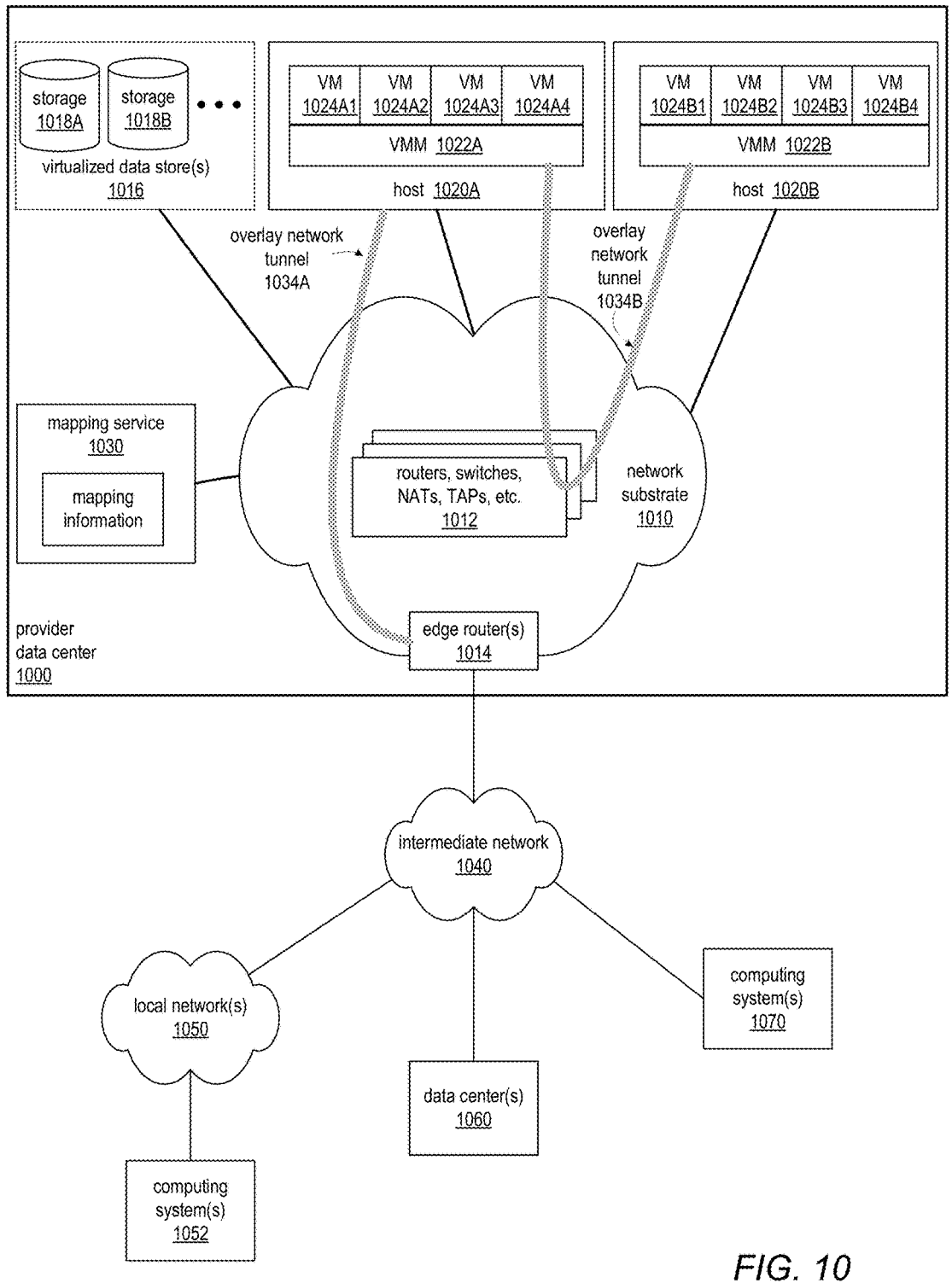
FIG. 10 illustrates an example data center that implements an overlay network on a network substrate using IP tunneling technology, according to some embodiments.

FIG. 10 illustrates an example data center that implements an overlay network on a network substrate using IP tunneling technology, according to at least some embodiments. A provider data center 1000 may include a network substrate that includes networking devices 1012 such as routers, switches, network address translators (NATs), and so on. At least some embodiments may employ an Internet Protocol (IP) tunneling technology to provide an overlay network via which encapsulated packets may be passed through network substrate 1010 using tunnels. The IP tunneling technology may provide a mapping and encapsulating system for creating an overlay network on a network (e.g., a local network in data center 1000 of FIG. 10) and may provide a separate namespace for the overlay layer (the public IP addresses) and the network substrate 1010 layer (the private IP addresses). Packets in the overlay layer may be checked against a mapping directory (e.g., provided by mapping service 1030) to determine what their tunnel substrate target (private IP address) should be. The IP tunneling technology provides a virtual network topology (the overlay network); the interfaces (e.g., service APIs) that are presented to clients are attached to the overlay network so that when a client provides an IP address to which the client wants to send packets, the IP address is run in virtual space by communicating with a mapping service (e.g., mapping service 1030) that knows where the IP overlay addresses are.

In at least some embodiments, the IP tunneling technology may map IP overlay addresses (public IP addresses) to substrate IP addresses (private IP addresses), encapsulate the packets in a tunnel between the two namespaces, and deliver the packet to the correct endpoint via the tunnel, where the encapsulation is stripped from the packet. In FIG. 10, an example overlay network tunnel 1034A from a virtual machine (VM) 1024A on host 1020A to a device on the intermediate network 1050 and an example overlay network tunnel 1034B between a VM 1024B on host 1020B and a VM 1024C on host 1020C are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (private IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the private IP addresses.

Referring to FIG. 10, at least some networks in which embodiments may be implemented may include hardware virtualization technology that enables multiple operating systems to run concurrently on a host computer (e.g., hosts 1020A and 1020B of FIG. 10), i.e. as virtual machines (VMs) 1024 on the hosts 1020. The VMs 1024 may, for example, be rented or leased to clients of a network provider. A hypervisor, or virtual machine monitor (VMM) 1022, on a host 1020 presents the VMs 1024 on the host with a virtual platform and monitors the execution of the VMs 1024. Each VM 1024 may be provided with one or more private IP addresses; the VMM 1022 on a host 1020 may be aware of the private IP addresses of the VMs 1024 on the host. A mapping service 1030 may be aware of all network IP prefixes and the IP addresses of routers or other devices serving IP addresses on the local network. This includes the IP addresses of the VMMs 1022 serving multiple VMs 1024. The mapping service 1030 may be centralized, for example on a server system, or alternatively may be distributed among two or more server systems or other devices on the network. A network may, for example, use the mapping service technology and IP tunneling technology to, for example, route data packets between VMs 1024 on different hosts 1020 within the data center 1000 network; note that an interior gateway protocol (IGP) may be used to exchange routing information within such a local network.

In addition, a network such as the provider data center 1000 network (which is sometimes referred to as an autonomous system (AS)) may use the mapping service technology, IP tunneling technology, and routing service technology to route packets from the VMs 1024 to Internet destinations, and from Internet sources to the VMs 1024. Note that an external gateway protocol (EGP) or border gateway protocol (BGP) is typically used for Internet routing between sources and destinations on the Internet. FIG. 10 shows an example provider data center 1000 implementing a network that provides resource virtualization technology and that provides full Internet access via edge router(s) 1014 that connect to Internet transit providers, according to at least some embodiments. The provider data center 1000 may, for example, provide clients the ability to implement virtual computing systems (VMs 1024) via a hardware virtualization service and the ability to implement virtualized data stores 1016 on storage resources 1018 via a storage virtualization service.

The data center 1000 network may implement IP tunneling technology, mapping service technology, and a routing service technology to route traffic to and from virtualized resources, for example to route packets from the VMs 1024 on hosts 1020 in data center 1000 to Internet destinations, and from Internet sources to the VMs 1024. Internet sources and destinations may, for example, include computing systems 1070 connected to the intermediate network 1040 and computing systems 1052 connected to local networks 1050 that connect to the intermediate network 1040 (e.g., via edge router(s) 1014 that connect the network 1050 to Internet transit providers). The provider data center 1000 network may also route packets between resources in data center 1000, for example from a VM 1024 on a host 1020 in data center 1000 to other VMs 1024 on the same host or on other hosts 1020 in data center 1000.

A service provider that provides data center 1000 may also provide additional data center(s) 1060 that include hardware virtualization technology similar to data center 1000 and that may also be connected to intermediate network 1040. Packets may be forwarded from data center 1000 to other data centers 1060, for example from a VM 1024 on a host 1020 in data center 1000 to another VM on another host in another, similar data center 1060, and vice versa.

While the above describes hardware virtualization technology that enables multiple operating systems to run concurrently on host computers as virtual machines (VMs) on the hosts, where the VMs may be rented or leased to clients of the network provider, the hardware virtualization technology may also be used to provide other computing resources, for example storage resources 1018, as virtualized resources to clients of a network provider in a similar manner.

Figure 11:
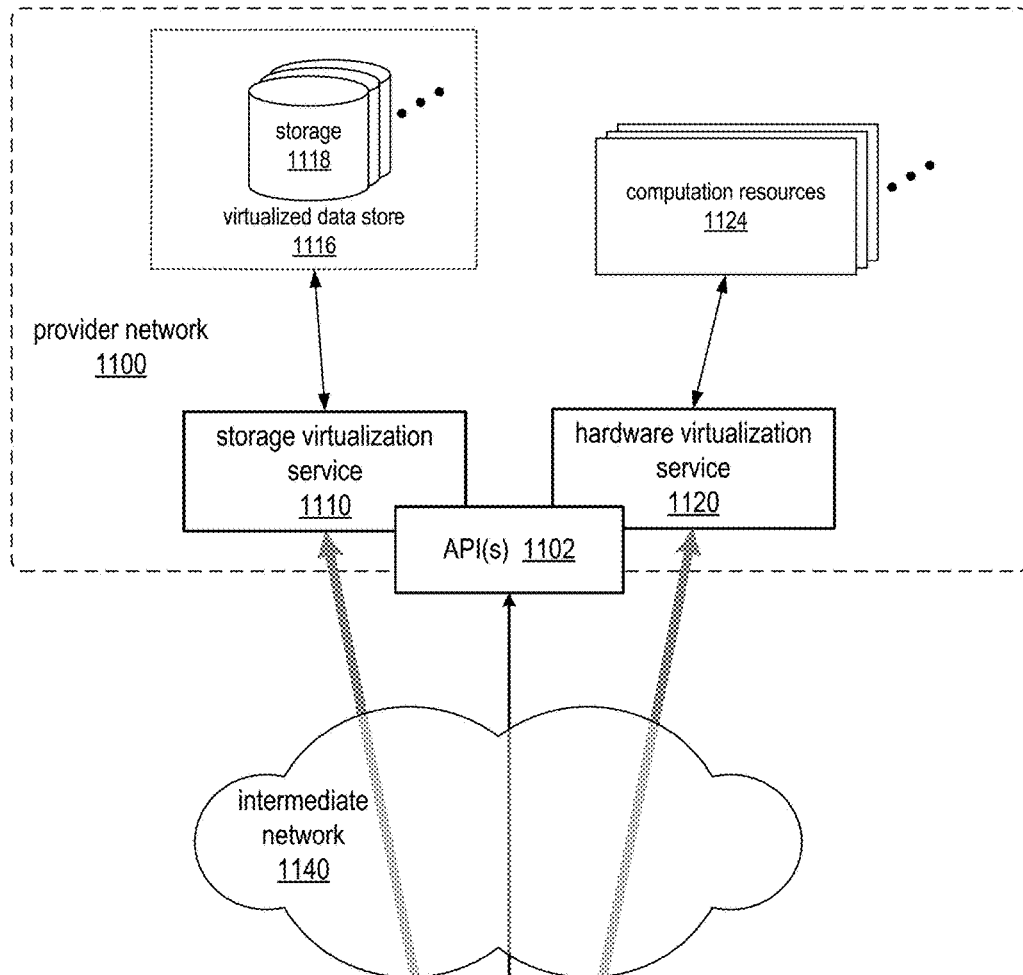
FIG. 11 is a block diagram of an example provider network that provides a storage virtualization service and a hardware virtualization service to clients, according to at least some embodiments.
Figure 11:
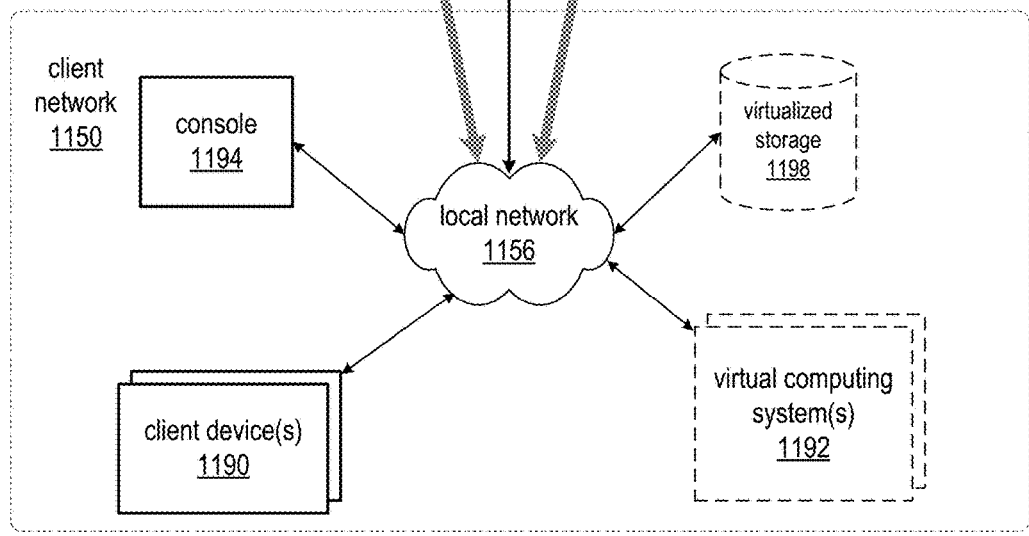

FIG. 11 is a block diagram of an example provider network that provides a storage virtualization service and a hardware virtualization service to clients, according to at least some embodiments. Hardware virtualization service

1120 provides multiple computation resources 1124 (e.g., VMs) to clients. The computation resources 1124 may, for example, be rented or leased to clients of the provider network 1100 (e.g., to a client that implements client network 1150). Each computation resource 1124 may be provided with one or more private IP addresses. Provider network 1100 may be configured to route packets from the private IP addresses of the computation resources 1124 to public Internet destinations, and from public Internet sources to the computation resources 1124.

Provider network 1100 may provide a client network 1150, for example coupled to intermediate network 1140 via local network 1156, the ability to implement virtual computing systems 1192 via hardware virtualization service 1120 coupled to intermediate network 1140 and to provider network 1100. In some embodiments, hardware virtualization service 1120 may provide one or more APIs 1102, for example a web services interface, via which a client network 1150 may access functionality provided by the hardware virtualization service 1120, for example via a console 1194. In at least some embodiments, at the provider network 1100, each virtual computing system 1192 at client network 1150 may correspond to a computation resource 1124 that is leased, rented, or otherwise provided to client network 1150.

From an instance of a virtual computing system 1192 and/or another client device 1190 or console 1194, the client may access the functionality of storage virtualization service 1110, for example via one or more APIs 1102, to access data from and store data to a virtual data store 1116 provided by the provider network 1100. In some embodiments, a virtualized data store gateway (not shown) may be provided at the client network 1150 that may locally cache at least some data, for example frequently accessed or critical data, and that may communicate with virtualized data store service 1110 via one or more communications channels to upload new or modified data from a local cache so that the primary store of data (virtualized data store 1116) is maintained. In at least some embodiments, a user, via a virtual computing system 1192 and/or on another client device 1190, may mount and access virtual data store 1116 volumes, which appear to the user as local virtualized storage 1198.

While not shown in FIG. 11, the virtualization service(s) may also be accessed from resource instances within the provider network 1100 via API(s) 1102. For example, a client, appliance service provider, or other entity may access a virtualization service from within a respective private network on the provider network 1100 via an API 1102 to request allocation of one or more resource instances within the private network or within another private network.

Figure 12:
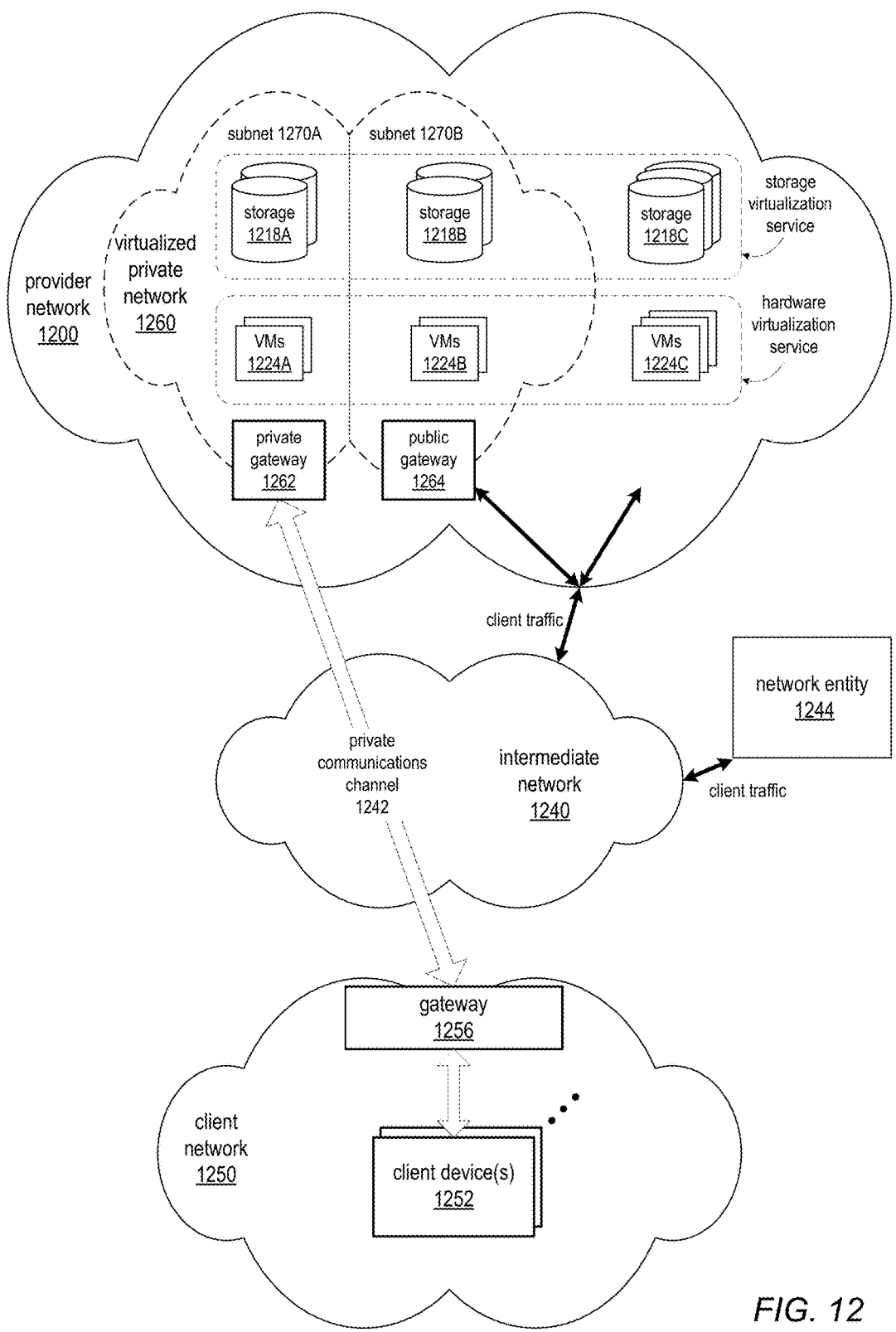
FIG. 12 illustrates an example provider network that provides virtualized private networks to at least some clients, according to at least some embodiments.

FIG. 12 illustrates an example provider network that provides private networks on the provider network to at least some clients, according to at least some embodiments. A client's virtualized private network 1260 on a provider network 1200, for example, enables a client to connect their existing infrastructure (e.g., devices 1252) on client network 1250 to a set of logically isolated resource instances (e.g., VMs 1224A and 1224B and storage 1218A and 1218B), and to extend management capabilities such as security services, firewalls, and intrusion detection systems to include their resource instances.

A client's virtualized private network 1260 may be connected to a client network 1250 via a private communications channel 1242. A private communications channel 1242 may, for example, be a tunnel implemented according to a network tunneling technology or some other technology over an intermediate network 1240. The intermediate network may, for example, be a shared network or a public network such as the Internet. Alternatively, a private communications channel 1242 may be implemented over a direct, dedicated connection between virtualized private network 1260 and client network 1250.

A public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In embodiments, either a shared network or a public network may serve as an intermediate network between a provider network and a client network.

To establish a virtualized private network 1260 for a client on provider network 1200, one or more resource instances (e.g., VMs 1224A and 1224B and storage 1218A and 1218B) may be allocated to the virtualized private network 1260. Note that other resource instances (e.g., storage 1218C and VMs 1224C) may remain available on the provider network 1200 for other client usage. A range of public IP addresses may also be allocated to the virtualized private network 1260. In addition, one or more networking devices (routers, switches, etc.) of the provider network 1200 may be allocated to the virtualized private network 1260. A private communications channel 1242 may be established between a private gateway 1262 at virtualized private network 1260 and a gateway 1256 at client network 1250.

In at least some embodiments, in addition to, or instead of, a private gateway 1262, virtualized private network 1260 may include a public gateway 1264 that enables resources within virtualized private network 1260 to communicate directly with entities (e.g., network entity 1244) via intermediate network 1240, and vice versa, instead of or in addition to via private communications channel 1242.

Virtualized private network 1260 may be, but is not necessarily, subdivided into two or more subnetworks, or subnets, 1270. For example, in implementations that include both a private gateway 1262 and a public gateway 1264, the private network may be subdivided into a subnet 1270A that includes resources (VMs 1224A and storage 1218A, in this example) reachable through private gateway 1262, and a subnet 1270B that includes resources (VMs 1224B and storage 1218B, in this example) reachable through public gateway 1264.

The client may assign particular client public IP addresses to particular resource instances in virtualized private network 1260. A network entity 1244 on intermediate network 1240 may then send traffic to a public IP address published by the client; the traffic is routed, by the provider network 1200, to the associated resource instance. Return traffic from the resource instance is routed, by the provider network 1200, back to the network entity 1244 over intermediate network 1240. Note that routing traffic between a resource instance and a network entity 1244 may require network address translation to translate between the public IP address and the private IP address of the resource instance.

At least some embodiments may allow a client to remap public IP addresses in a client's virtualized private network 1260 as illustrated in FIG. 12 to devices on the client's external network 1250. When a packet is received (e.g., from network entity 1244), the network 1200 may determine that the destination IP address indicated by the packet has been remapped to an endpoint on external network 1250 and handle routing of the packet to the respective endpoint, either via private communications channel 1242 or via the intermediate network 1240. Response traffic may be routed from the endpoint to the network entity 1244 through the provider network 1200, or alternatively may be directly routed to the network entity 1244 by the client network 1250. From the perspective of the network entity 1244, it appears as if the network entity 1244 is communicating with the public IP address of the client on the provider network 1200. However, the network entity 1244 has actually communicated with the endpoint on client network 1250.

While FIG. 12 shows network entity 1244 on intermediate network 1240 and external to provider network 1200, a network entity may be an entity on provider network 1200. For example, one of the resource instances provided by provider network 1200 may be a network entity that sends traffic to a public IP address published by the client.

Illustrative System

Figure 13:
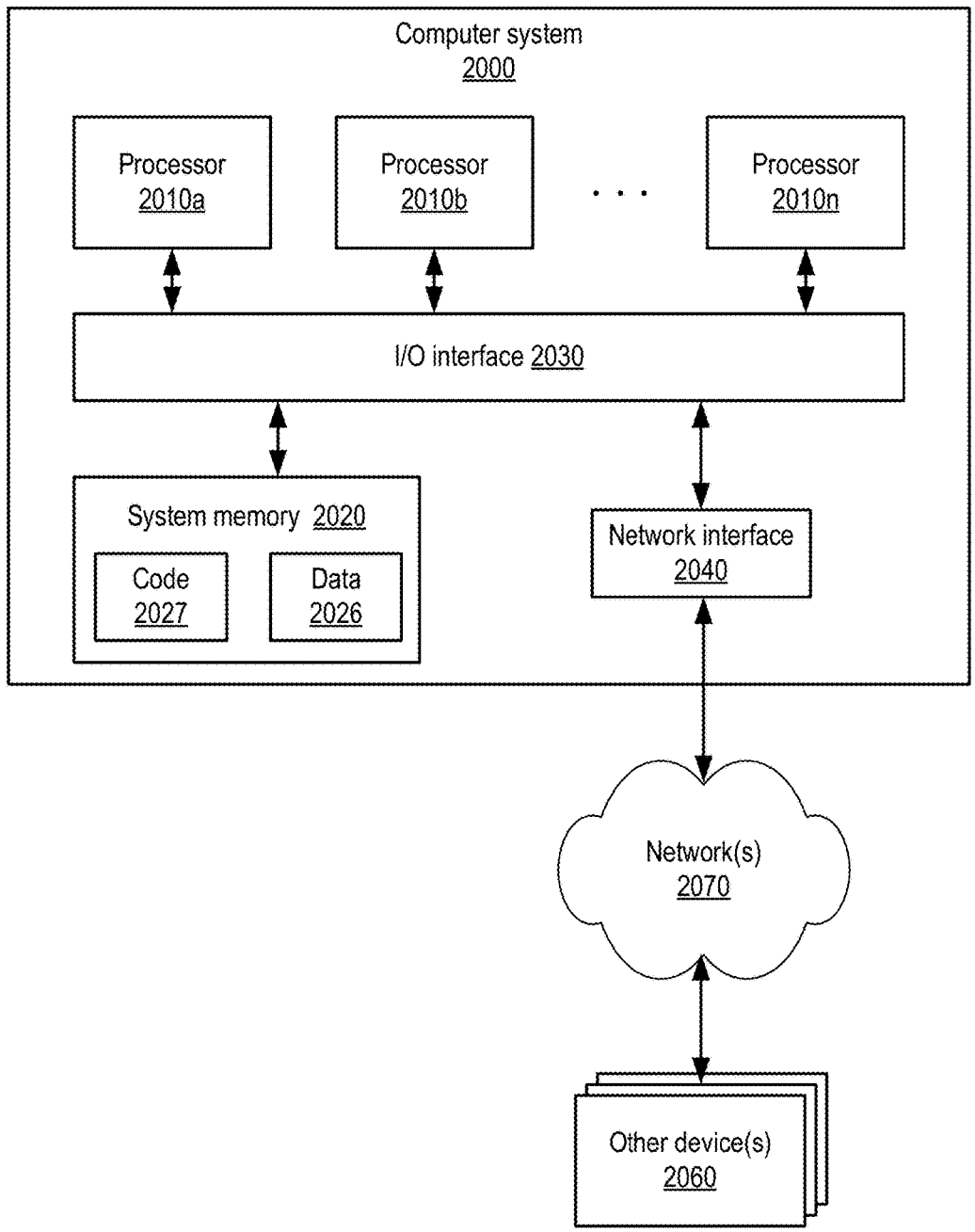
FIG. 13 is a block diagram illustrating an example computer system that may be used in some embodiments.

In at least some embodiments, a server that implements a portion or all of the methods and apparatus for private network address obfuscation and verification as described herein may include a general-purpose computer system that includes or is configured to access one or more computer-accessible media, such as computer system 2000 illustrated in FIG. 13. In the illustrated embodiment, computer system 2000 includes one or more processors 2010 coupled to a system memory 2020 via an input/output (I/O) interface 2030. Computer system 2000 further includes a network interface 2040 coupled to I/O interface 2030.

In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store instructions and data accessible by processor(s) 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for private network address obfuscation and verification, are shown stored within system memory 2020 as code 2025 and data 2026.

In one embodiment, I/O interface 2030 may be configured to coordinate I/O traffic between processor 2010, system memory 2020, and any peripheral devices in the device, including network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices 2060 attached to a network or networks 2050, such as other computer systems or devices as illustrated in FIGS. 1 through 13, for example. In various embodiments, network interface 2040 may support communication via any suitable wired or wireless general data networks, such as types of Ethernet network, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, system memory 2020 may be one embodiment of a computer-accessible medium configured to store program instructions and data as described above for FIGS. 1 through 12 for implementing embodiments of methods and apparatus for private network address obfuscation and verification. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 2000 via I/O interface 2030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a border device for a network, the border device comprising memory and at least one hardware processor coupled to the memory and configured to:
receive outgoing first network protocol packets from one or more endpoints on the network, wherein the endpoints are assigned addresses within a private address space of the network according to a first network protocol, wherein each received packet includes an address of a source endpoint on the network according to the first network protocol and an address of a destination for the packet according to the first network protocol;
for at least one of the first network protocol packets:
generate an outgoing packet according to a second network protocol, wherein the outgoing packet includes a source address field and a destination address field, wherein a first portion of the source address field indicates a source address for the outgoing packet according to the second network protocol;
insert the address of the source endpoint in a second portion of the source address field of the second network protocol packet;
apply a hash function to at least the source address field of the outgoing packet to generate a hash value;
concatenate the hash value with the address of the source endpoint in the second portion of the source address field;
apply an obfuscation function to the concatenated hash value and address in the second portion of the source address field to obfuscate the content of the second portion of the source address field; and
send the outgoing packet onto an external network for routing to a respective destination according to the second network protocol.

2. The system as recited in claim 1, wherein the addresses according to the first network protocol are 32-bit addresses, and wherein the addresses according to the second network protocol are 128-bit addresses, wherein the hash function generates a 32-bit hash value, and wherein the 32-bit hash value and the 32-bit source address are concatenated and obfuscated in 64 bits of the 128-bit source address field.

3. The system as recited in claim 1, wherein the hash function is applied to at least the source address field and a destination address field of the outgoing packet to generate the hash value.

4. The system as recited in claim 1, wherein the border device is further configured to:
receive incoming second network protocol packets from the external network, wherein each incoming packet includes a source address field and a destination address field, wherein the source address field indicates a source address of the incoming packet according to the second network protocol, and wherein a portion of the destination address field includes an obfuscated value;
for at least one of the incoming second network protocol packets:
apply an inverse of the obfuscation function to the obfuscated value to extract an original hash value and an address of a destination endpoint on the network according to the first network protocol;
apply the hash function to at least the destination address field of the incoming packet to generate a new hash value;
compare the new hash value to the original hash value to validate the incoming packet;
generate an incoming first network protocol packet from the validated incoming second network protocol packet, wherein the incoming first network protocol packet indicates the address of the destination endpoint on the network according to the first network protocol; and
send the incoming first network protocol packet onto the network for routing to the respective destination endpoint according to the first network protocol.

5. A method, comprising:
translating, by a border device on a network, a packet from a first network protocol to a second network protocol to generate an outgoing packet, wherein the outgoing packet indicates a source address in a private address space of the network and an address of a destination for the packet, and wherein the outgoing packet includes a source address field and a destination address field;
inserting the source address in a portion of the source address field of the outgoing packet;
applying a hash function to at least the source address field of the outgoing packet to generate a hash value;
concatenating the hash value with the source address in the portion of the source address field;
applying an obfuscation function to the concatenated hash value and source address in the source address field; and
sending, by the border device, the outgoing packet onto an external network for routing to the respective destination according to the second network protocol.

6. The method as recited in claim 5, further comprising:
receiving, by the border device, an incoming packet from the external network, wherein the incoming packet includes a destination address field;
applying an inverse of the obfuscation function to a portion of the destination address field to extract a hash value and a destination address in the private address space of the network; and
validating or invalidating the incoming packet according to the extracted hash value.

7. The method as recited in claim 6, wherein said validating or invalidating the incoming packet according to the extracted hash value comprises:
applying the hash function to at least the destination address field of the incoming packet to generate a new hash value; and
comparing the new hash value to the extracted hash value to determine if the incoming packet is valid or invalid, wherein the packet is valid if the new hash value matches the extracted hash value and invalid if the new hash value does not match the extracted hash value.

8. The method as recited in claim 6, further comprising, upon validating the incoming packet:

translating the validated incoming packet from the second network protocol to the first network protocol, wherein the translated packet indicates the destination address in the private address space of the network; and sending the translated packet onto the network for delivery to the respective destination according to the first network protocol.

9. The method as recited in claim 6, further comprising, upon invalidating the incoming packet, dropping the incoming packet.

10. The method as recited in claim 5, wherein the first network protocol is Internet Protocol version 4 (IPv4), and wherein the second network protocol is Internet Protocol version 6 (IPv6).

11. The method as recited in claim 5, wherein the source address in the private address space of the network is a 32-bit address, and wherein the source address field of the outgoing packet is a 128-bit address field, wherein the hash function generates a 32-bit hash value, and wherein the 32-bit hash value and the 32-bit source address are concatenated and obfuscated in 64 bits of the 128-bit source address field.

12. The method as recited in claim 5, wherein the hash function is applied to the source address field and a destination address field of the outgoing packet to generate the hash value.

13. The method as recited in claim 5, wherein the hash function is a Cyclic Redundancy Check (CRC) function.

14. The method as recited in claim 5, wherein the obfuscation function implements one of an invertible bit shuffle algorithm, a block cipher algorithm, or an encryption algorithm.

15. The method as recited in claim 5, further comprising:
receiving, by a device at the destination, the packet sent by the border device; and
applying, by the device at the destination, an inverse of the obfuscation function to a portion of the source address field of the received packet to extract the source address from the obfuscated content.

16. A non-transitory computer-readable storage medium storing program instructions that when executed on one or more computers cause the one or more computers to implement an ingress processing module for a network configured to:
receive incoming second network protocol packets from an external network, wherein each incoming packet includes a source address field and a destination address field, wherein a portion of the destination address field includes an obfuscated value;
for at least one of the incoming second network protocol packets:
extract a hash value and a destination address in a private address space of the network from the obfuscated value according to an inverse of an obfuscation function that was used to generate the obfuscated value;
determine that the incoming packet is valid according to the extracted hash value;
upon determining that the packet is valid, translate the validated incoming packet from the second network protocol to the first network protocol, wherein the translated packet indicates the extracted destination address in the private address space of the network; and
send the translated packet onto the network for delivery to the respective destination according to the first network protocol.

17. The non-transitory computer-readable storage medium as recited in claim 16, wherein, to determine that the incoming packet is valid according to the extracted hash value, the ingress processing module is configured to:
apply a hash function to at least the destination address field of the incoming packet to generate a new hash value; and
compare the new hash value to the extracted hash value to determine if the incoming packet is valid or invalid, wherein the packet is valid if the new hash value matches the extracted hash value and invalid if the new hash value does not match the extracted hash value.

18. The non-transitory computer-accessible storage medium as recited in claim 16, wherein the program instructions, when executed on the one or more computers, further cause the one or more computers to implement an egress processing module for the network configured to:
translate outgoing packets received from sources on the network from the first network protocol to the second network protocol, wherein each translated outgoing packet indicates a source address in the private address space of the network and an address of a destination for the outgoing packet, and wherein each outgoing packet includes a source address field and a destination address field;
for at least one of the translated outgoing packets:
insert the respective source address in a portion of the source address field of the outgoing packet;
apply a hash function to at least the source address field of the outgoing packet to generate a hash value;
concatenate the hash value with the source address in the portion of the source address field;
apply the obfuscation function to the concatenated hash value and source address in the source address field; and
send the outgoing packet onto the external network for routing to the respective destination according to the second network protocol.

19. The non-transitory computer-accessible storage medium as recited in claim 16, wherein the ingress processing module is further configured to, for at least one other of the incoming second network protocol packets:
determine that the incoming packet is not valid according to the extracted hash value; and
dispose of the incoming packet without translating and without sending the incoming packet on the network.

20. The non-transitory computer-accessible storage medium as recited in claim 16, wherein the first network protocol is Internet Protocol version 4 (IPv4), and wherein the second network protocol is Internet Protocol version 6 (IPv6).

* * * * *